United States Patent [19]

Sparrow

[11] Patent Number: 5,631,971
[45] Date of Patent: May 20, 1997

[54] VECTOR BASED TOPOLOGICAL FINGERPRINT MATCHING

[76] Inventor: Malcolm K. Sparrow, 93 Church St., Winchester, Mass. 01890

[21] Appl. No.: 276,155

[22] Filed: Jul. 15, 1994

Related U.S. Application Data

[63] Continuation of Ser. No. 248,012, May 24, 1994, abandoned.

[51] Int. Cl.⁶ .................................................. G06K 9/00
[52] U.S. Cl. ............................................. 382/125; 382/209
[58] Field of Search ......................................... 382/124, 125, 382/126, 127, 197, 258, 259, 209, 305

[56] References Cited

U.S. PATENT DOCUMENTS

| | | | |
|---|---|---|---|
| 4,747,147 | 5/1988 | Sparrow | 382/125 |
| 4,944,021 | 7/1990 | Hoshino et al. | 382/125 |
| 4,947,442 | 8/1990 | Tanaka et al. | 382/125 |

OTHER PUBLICATIONS

A Topological Approach to the Matching of Single Fingerprints: Development of Algorithms for use on Rolled Impressions Sparrow et al National Bureau of Standards Publication NBS 500–124 May 1985.
A Topological Approach to the Matching of Single Fingerprints: Development of Algorithms for use on Latent Fingermarks Sparrow et al National Bureau of Standards Publication NBS 500–126 Oct. 1985.

*Primary Examiner*—Leo Boudreau
*Assistant Examiner*—Phuoc Tran
*Attorney, Agent, or Firm*—Jim Zegeer, Esq.

[57] ABSTRACT

A fingerprint recognition and retrieval system in which the positions of fingerprint minutiae points and an index number for each minutiae point are recorded in a storage medium. The local ridge flow direction in the vicinity of each minutiae point defined by ridge endings and ridge bifurcations is determined and a generating line is projected at an angle to the local ridge flow direction. The generating line has a length sufficient to span a predetermined number of ridges to each side of each of the minutiae points. Each ridge is traced, in two directions, from the point of crossing of the projected generating line along any crossed ridge line. The first occurring topological event is assigned a type code (T) to the topological event. A topological event code vector is generated for each minutiae comprising an ordered sequence of topological type codes encountered during the tracing and any associated minutiae reference numbers and sets of the vectors are stored in a machine searchable database. The matching algorithm systematically develops connected cluster of minutiae points within an unknown one of the fingerprints for which there exists a matching cluster of minutiae points within the fingerprint under comparison and wherein the topological relationships among the set of minutiae within the matching clusters are substantially identical.

20 Claims, 12 Drawing Sheets

0. The ridge goes out of sight without meeting any minutiae.

1. Not allocated

2. The ridge meets a bifurcation as if from the left fork.

3. The ridge ends.

4. The ridge meets a bifurcation as if from the right fork.

5. The ridge returns to its starting point without any event occuring.

6. The ridge meets a new ridge starting on the left.

7. The ridge bifurcates.

8. Ridge meets a new ridge starting on the right.

9. Not allocated

A. Not allocated

B. Ridge encounters blurred or unclear area.

C,D,E. Not allocated

F. Used for vector padding.

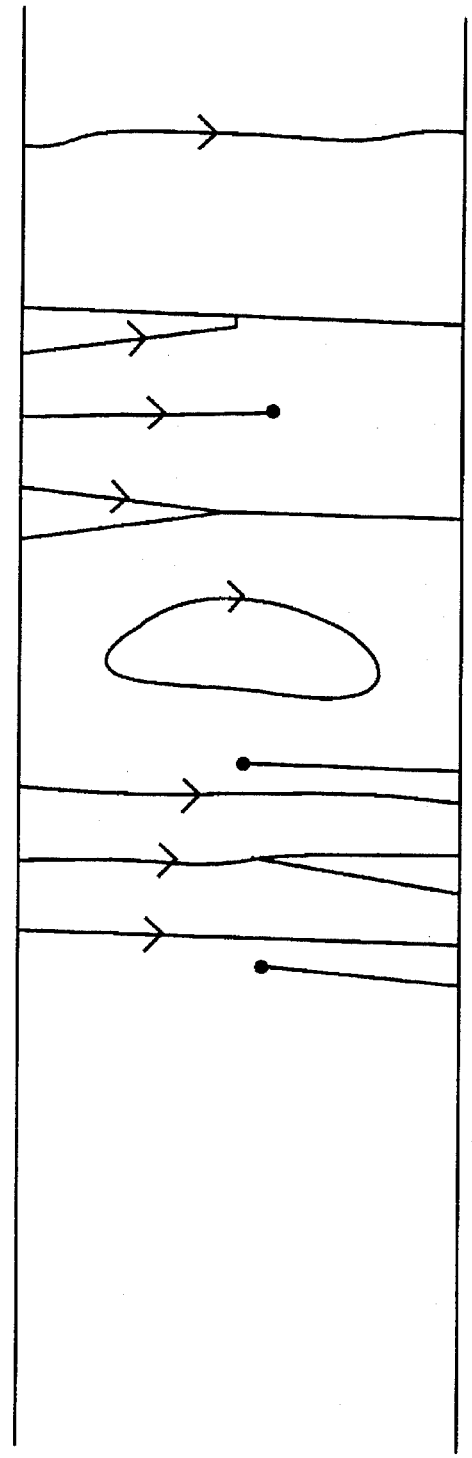

Figure 4

RN == Minutiae Reference Numbers.

Figure 6

Key to data fields:

- Minutiae Reference Numbers: RN
- Minutiae Type Code ('e' or 'b')
- Spatial Coordinates
- Angular Orientation
- Spare field

--> search\6245-S3.TRC vs file\2822.TRC <--

LEVEL 1: Search/file minutia pairs passing: 290
LEVEL 2: Search/file minutia pairs passing: 255
LEVEL 3: Non-duplicative pairs passing  : 16
LEVEL 4: Number of clusters found       : 3

OVERALL RAW SCORE (sum of 2nd order composites)   : 8349
Info content (S,F) ( 245,  389).        Normalized score: 8760.3

TABLE 3:

| File | Search | Shift | Score | Comp1 | Comp2 |
| --- | --- | --- | --- | --- | --- |
| 28 | 16 | '0' | 37 | 235 | 1397 |
| 23 | 14 | '0' | 31 | 201 | 1129 |
| 25 | 15 | '0' | 26 | 177 | 1007 |
| 13 | 8  | '0' | 27 | 140 | 676  |
| 21 | 12 | '0' | 32 | 141 | 590  |
| 42 | 33 | '0' | 33 | 150 | 549  |
| 46 | 37 | '0' | 34 | 150 | 507  |
| 11 | 4  | '0' | 25 | 125 | 484  |
| 40 | 30 | '0' | 31 | 119 | 442  |
| 19 | 10 | '0' | 23 | 105 | 441  |
| 41 | 32 | 'f' | 24 | 108 | 323  |
| 14 | 7  | '0' | 19 | 71  | 281  |
| 48 | 38 | '0' | 21 | 65  | 173  |
| 44 | 34 | '0' | 26 | 57  | 122  |
| 30 | 20 | '0' | 19 | 57  | 114  |
| 31 | 21 | 'f' | 16 | 57  | 114  |

| Cluster No: | 1 | Size: 11 | | Score: 6005 | |
|---|---|---|---|---|---|
| | 28 | 16 | 'o' | 37 | 1397 |
| | 11 | 4 | 'o' | 25 | 484 |
| | 13 | 8 | 'o' | 27 | 676 |
| | 21 | 12 | 'o' | 32 | 590 |
| | 25 | 15 | 'o' | 26 | 1007 |
| | 23 | 14 | 'o' | 31 | 1129 |
| | 18 | 13 | 's' | 11 | 0 |
| | 4 | 2 | 'o' | 11 | 0 |
| | 20 | 11 | 's' | 6 | 0 |
| | 19 | 10 | 'o' | 23 | 441 |
| | 14 | 7 | 'o' | 19 | 281 |

| Cluster No: | 2 | Size: 8 | | Score: 2116 | |
|---|---|---|---|---|---|
| | 42 | 33 | 'o' | 33 | 549 |
| | 40 | 30 | 'o' | 31 | 442 |
| | 48 | 38 | 'o' | 21 | 173 |
| | 46 | 37 | 'o' | 34 | 507 |
| | 45 | 36 | 'o' | 10 | 0 |
| | 41 | 32 | 'f' | 24 | 323 |
| | 47 | 35 | 'o' | 10 | 0 |
| | 44 | 34 | 'o' | 26 | 122 |

| Cluster No: | 3 | Size: 5 | | Score: 228 | |
|---|---|---|---|---|---|
| | 30 | 20 | 'o' | 19 | 114 |
| | 32 | 23 | 'o' | 11 | 0 |
| | 31 | 21 | 'f' | 16 | 114 |
| | 43 | 29 | 'o' | 6 | 0 |
| | 38 | 26 | 'o' | 6 | 0 |

Best Cluster: No. 1    Size: 11    Score: 6005    (Norm: 7300.8)

Figure 10

Combined cluster:   Size: 24   Score: (Norm: 8760.3)

| | | | | |
|---|---|---|---|---|
| 28 | 16 | 'o' | 37 | 1397 |
| 11 | 4  | 'o' | 25 | 484 |
| 13 | 8  | 'o' | 27 | 676 |
| 21 | 12 | 'o' | 32 | 590 |
| 25 | 15 | 'o' | 26 | 1007 |
| 23 | 14 | 'o' | 31 | 1129 |
| 18 | 13 | 's' | 11 | 0 |
| 4  | 2  | 'o' | 11 | 0 |
| 20 | 11 | 's' | 6  | 0 |
| 19 | 10 | 'o' | 23 | 441 |
| 14 | 7  | 'o' | 19 | 281 |
| 42 | 33 | 'o' | 33 | 549 |
| 40 | 30 | 'o' | 31 | 442 |
| 48 | 38 | 'o' | 21 | 173 |
| 46 | 37 | 'o' | 34 | 507 |
| 45 | 36 | 'o' | 10 | 0 |
| 41 | 32 | 'f' | 24 | 323 |
| 47 | 35 | 'o' | 10 | 0 |
| 44 | 34 | 'o' | 26 | 122 |
| 30 | 20 | 'o' | 19 | 114 |
| 32 | 23 | 'o' | 11 | 0 |
| 31 | 21 | 'f' | 16 | 114 |
| 43 | 29 | 'o' | 6  | 0 |
| 38 | 26 | 'o' | 6  | 0 |

Figure 11

Runtime Parameters

| | |
|---|---|
| Exact Match Score | : 5 |
| Close Match Score | : 3 |
| Dependent pair Score Reduction | : 2 |
| Minimumn Distance Tolerance | : 7 |
| Percentage Distance Tolerance | : 14 |
| Minimum Angular Tolerance | : 30 |
| Level 1: minimum vector content | : 3 |
| Level 2: minimum hex overlay count | : 3 |
| Level 3: minimum vector match score | : 16 |
| Level 4: minimum cluster size | : 5 |

Figure 12

VECTOR BASED TOPOLOGICAL FINGERPRINT MATCHING

REFERENCE TO RELATED APPLICATION

This application is a continuation application of my application U.S. Ser. No. 08/248,012, filed May 24, 1994, and entitled "VECTOR BASED TOPOLOGICAL FINGERPRINT MATCHING, now abandoned.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND AND BRIEF DESCRIPTION OF THE INVENTION

The invention relates to fingerprint coding and recognition and retrieval systems based on generally invarying topological irregularities, characteristics or minutiae (which terms are used interchangeably herein) of fingerprints. The term "fingerprint" or "print" is used in reference to the epidermal ridge lines of the ten fingers of the human hand, palm prints, toe and sole prints of humans wherein such epidermal ridge lines and characteristic features thereof are in patterns unique to a particular individual.

In my U.S. Pat. Nos. 4,747,147 and 4,817,183 and my papers entitled "Digital Coding of Single Fingerprints—A New Approach for the Computer Age", Journal of Police Science and Administration, Vol. X, No. 2, June 1982, (1) "A TOPOLOGICAL APPROACH TO THE MATCHING OF SINGLE FINGERPRINTS: DEVELOPMENT OF ALGORITHMS FOR USE ON ROLLED IMPRESSIONS", NBS Special Publication 500-124, May 1985, and (2) "A TOPOLOGICAL APPROACH TO THE MATCHING OF SINGLE FINGERPRINTS: DEVELOPMENT OF ALGORITHMS FOR USE ON LATENT FINGERMARKS", NBS Special Publication 500-126, October, 1985. I show that the soft elastic nature of human skin causes substantial variation of the spatial descriptions of successive impressions of the same fingerprints. Consequently, spatially based coding schemes used for forming machine searchable databases have inherent inaccuracies due to the fact that the spatial based coordinate system typically used for coding purposes could not take into account the wide variations in spatial distortions making the match or identification between two rolled prints on the same finger somewhat problematical particularly where the prints are taken at substantially different times or pressures.

Topological coding schemes provide concise digital codes that provide a more reliable basis for fingerprint identification systems. In my above referred to patents and paper, I disclose comparison methods based on topological coding of prints in which a topology base coding system for recording and comparing minutiae used a single vector array generated from topologically based coding of a fingerprint.

In the topological vector extraction part of the system disclosed in my above referred to patents, 1982 Paper and my NBS Special Publication 500-124, the core of the fingerprint is centrally located at a reference point and a horizontal line is projected through the core to intersect ridge lines to each side of the centrally located reference point. In the case of an arch a vertical line is drawn through successive ridge summits. From the points of crossing of the ridges with the projected horizontal or vertical line, the ridges are traced to the first significant irregularity and a type code (T) is assigned to the irregularity. In my patents, the distance (D) from the reference line is measured and these data are recorded in a predetermined order to constitute a topological vector for the print which then is recorded in a machine searchable database. Comparison of vectors takes the form of a sequence of array operations. Comparison of good quality rolled prints is performed extremely rapidly on this basis. In my NBS Special Publication 500-126 I disclose a system for topologically coding fingerprints wherein each topological code would be a vector generated by exploration from short straight lines orthogonal to ridge flow direction and drawn offset from a given characteristic (bifurcations suggested).

THE PRESENT INVENTION

An object of the present invention is to provide an improved fingerprint recognition and retrieval system.

A further object of the invention is to provide an improved topological matching system in which topological code vectors are generated from the fingerprint with one vector being generated for each minutiae revealed on the print.

Another object of the invention is to provide an improved topological event code incorporating the reference number of any other minutiae point encountered through ridge explorations or tracing from each vector generating line.

Another object of the invention is to provide a more versatile matching algorithm.

According to the present invention, topological code vectors are generated directly from the fingerprint (i.e. not via any topological coordinate representation as in my U.S. Pat. No. 4,747,147), one vector being generated for each minutiae revealed on the print.

As is common in the art, incoming fingerprint images are electronically processed to provide a skeleton image of ridge lines and minutiae points constituted by ridge endings and bifurcations with the spatial positions of the minutiae points and an reference or index number (N) for each minutiae point being recorded in a storage medium.

The local ridge flow directions in the vicinity of each minutiae point is determined and a generating line is projected at a predetermined angle transverse to the local ridge flow direction at each minutiae point (the predetermined angle being preferably orthogonal to a local ridge flow direction). The generating line has a length sufficient to span a predetermined number of ridges to each side of each minutiae point. For each minutiae point, from the point of crossing of the projected generating line with the ridges within the span, a tracing is made in two directions along each ridge line crossed by the generating line to the first occurring topological event.

A type code (T) is assigned to each topological event encountered by the ridge tracings. Then, from these data, a topological event code vector is generated for each minutiae with the topological event code vector being comprised of the topological type code for any minutiae encountered during the tracing and the reference or index number (N) for each associated minutiae. These data are stored as vectors in a machine searchable database. It is not necessary to make reference to any central core point or delta and all dependence on the presence of arbitrary selection of a central reference point within the print is therefore eliminated.

A matching algorithm is arranged in a sequence of graded stages with the computational intensity of each stage being controlled by the parameters. This enables the algorithm to be adapted easily for different purposes (from high resolution identification of poor quality latent images at one extreme, to rapid pass filtering of good quality scanned or rolled fingerprint images at the other) simply by changing the parameters set.

Moreover, the matching algorithm systematically develops "topologically connected clusters" within any two prints under comparison. It therefore seeks to develop a maximal topologically connected cluster within one print, for which there exists a matching cluster within the other print (and where the topological relationships between minutiae within the clusters are replicated). A final score is derived for this optimal cluster which reflects both the size of the cluster and the density of the topological connectivity data which is replicated within the other print.

Thus, an important feature of the invention is that the matching algorithm identifies the maximal topologically connected cluster of minutiae points within one print for which there exists a matching cluster of minutiae points within the print under comparison and where the topological relationships among the set of minutiae within the matching clusters are identical.

BRIEF DESCRIPTION OF THE DRAWINGS

The above and other objects, advantages and features of the invention will become more apparent when considered with the following specification and accompanying drawings wherein:

FIG. 4 is a table illustrating the ridge exploration event codes for use in the topological event code vector formations, FIG. 6 shows a sample part of a composite data record, FIG. 9 shows a detailed matcher output of two prints under comparison, and the final version of Table 3 is printed-out in full, FIG. 10 shows a print-out of Table 4 revealing a number of different clusters with the cluster score in each case being calculated as the sum of the second order neighborhood scores for each search/file minutiae pairing within the cluster, FIG. 11 shows the final combined cluster produced during the print comparison following through from FIGS. 9 and 10, and FIG. 12 shows a full table of matcher parameters.

DETAILED DESCRIPTION OF THE INVENTION

In a fully automated system, rolled prints are received as grey-scale images, and pass through binarization 10 and skeletonization 11 stages (image processing steps).

Latent images will normally be photographed, placed under a scanner, and the resulting image displayed on a screen. A fingerprint technician then traces the ridge pattern on the computer screen using either a mouse or a light pen of some kind. The resulting tracing (albeit there is no physical tracing) acts as the skeleton image.

Either process produces a skeleton image of the ridge pattern. The difference is only that, in the case of latents, technicians intervene in interpreting and editing the ridge pattern; and with good quality prints (rolled, or live-scan) no human intervention would be required.

From the skeleton image onwards, the encoding processes are the same.

(1) All minutiae points (ridge-endings and bifurcations) are detected and their spatial positions noted in block 12. This process is well understood in the art.

(2) Blurred areas (where the ridge structure is unclear) are established and their positions and boundaries recorded (in what is commonly called a "blur map") in 13.

(3) The local ridge flow direction is determined in the vicinity of each minutiae point in 14.

(4) In block 15, a vector "generating line" is placed orthogonal to the ridge flow direction, preferably slightly offset from the minutiae point, at each minutiae. The generating line is drawn long enough to cover a predetermined number of ridges either side of the central minutiae point. The number of ridges covered each side is a parameter of the encoding and matching process, which we will call "SPAN".

Figure 1A:
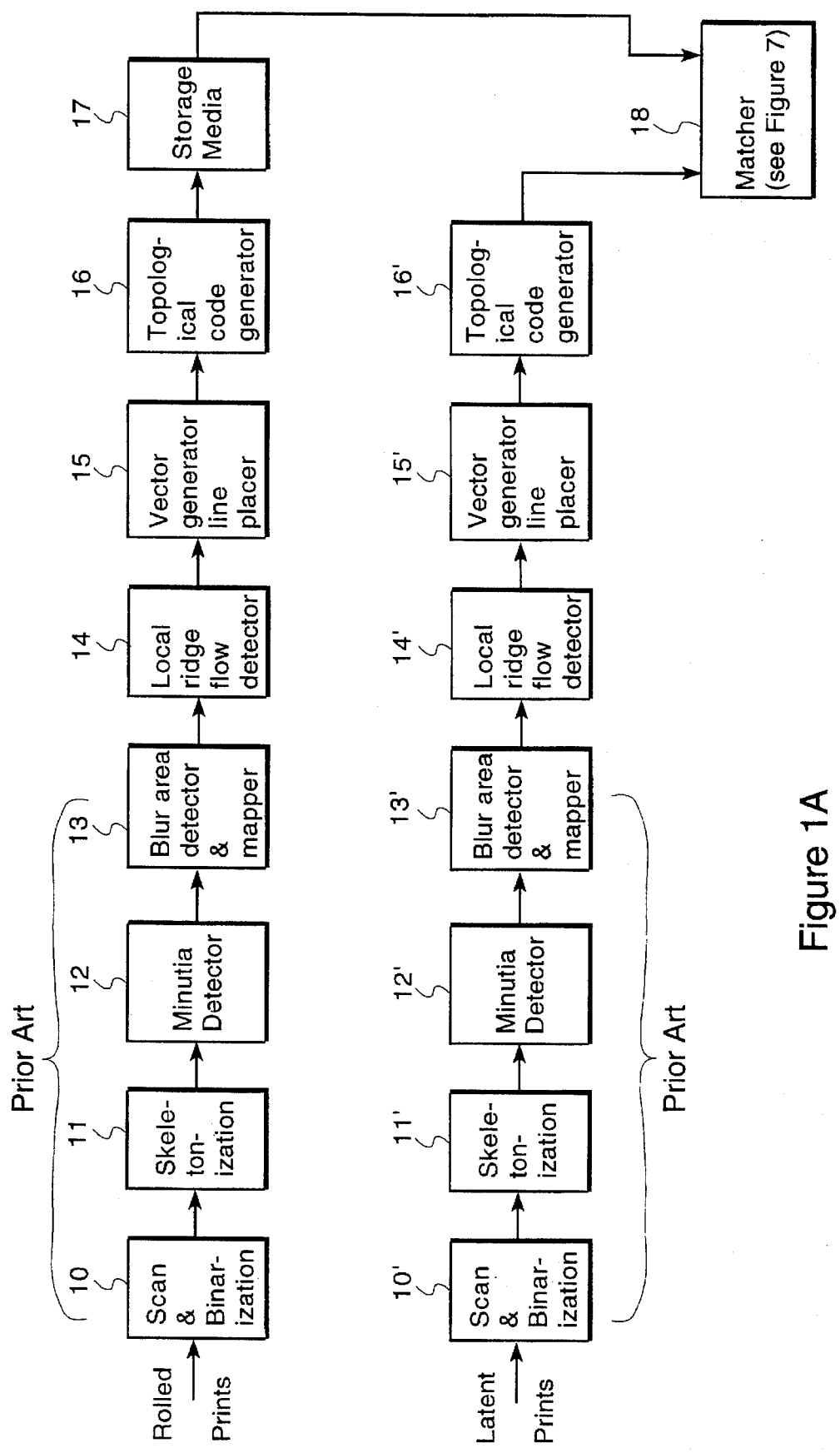
FIG. 1A is a block diagram of a fingerprint recording and recognition system incorporating the invention.
Figure 1B:
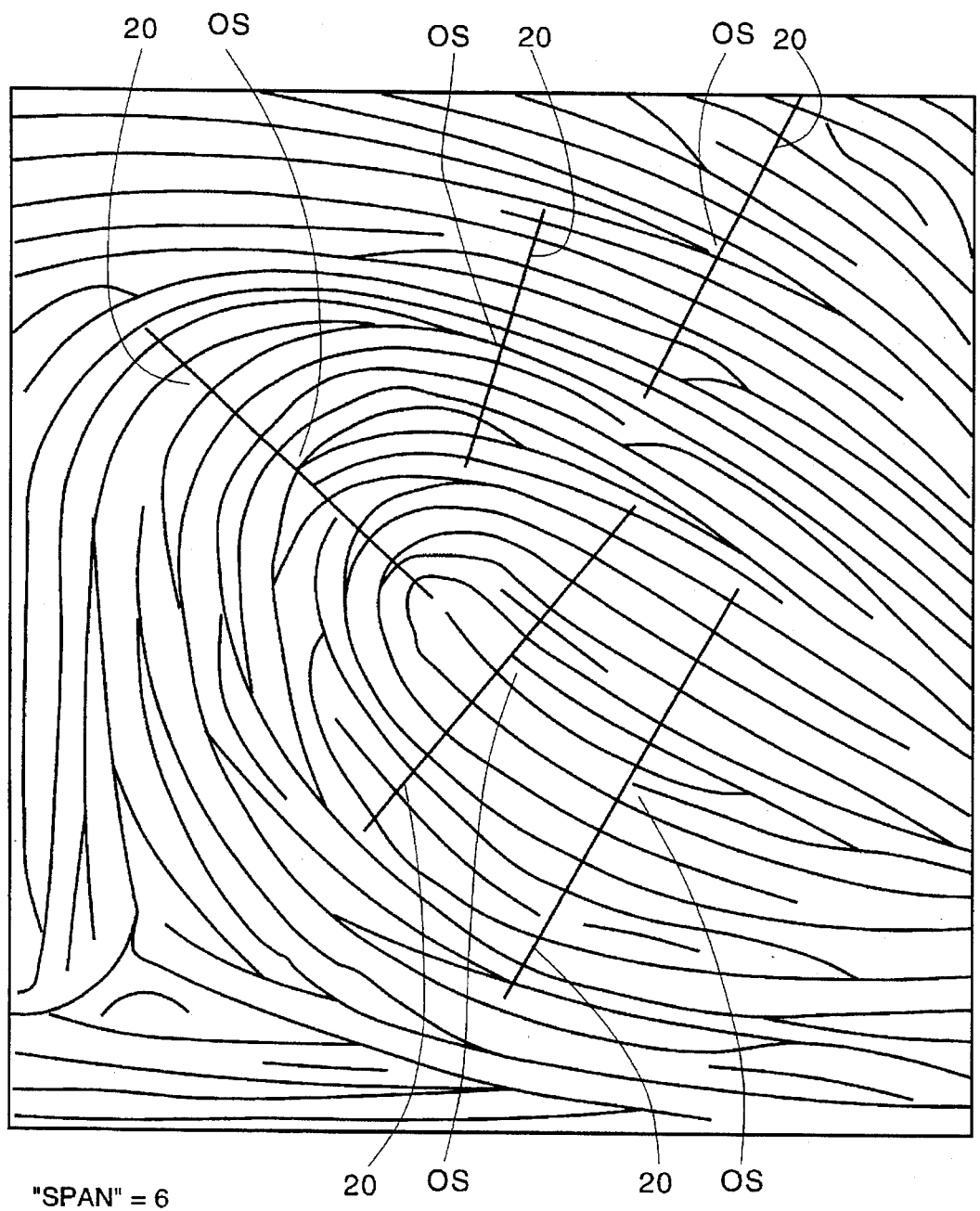
FIG. 1B is a diagrammatic illustration showing how generating lines are off-set from minutiae points and oriented orthogonal to a local ridge flow direction (the selection of lines being shown only for purposes of illustration)

FIG. 1B shows a skeletal print with such generating lines superimposed transverse to the ridge flow direction, where SPAN is assumed to be 6. A selection of lines only is displayed, for purposes of illustration.

Figure 2A:
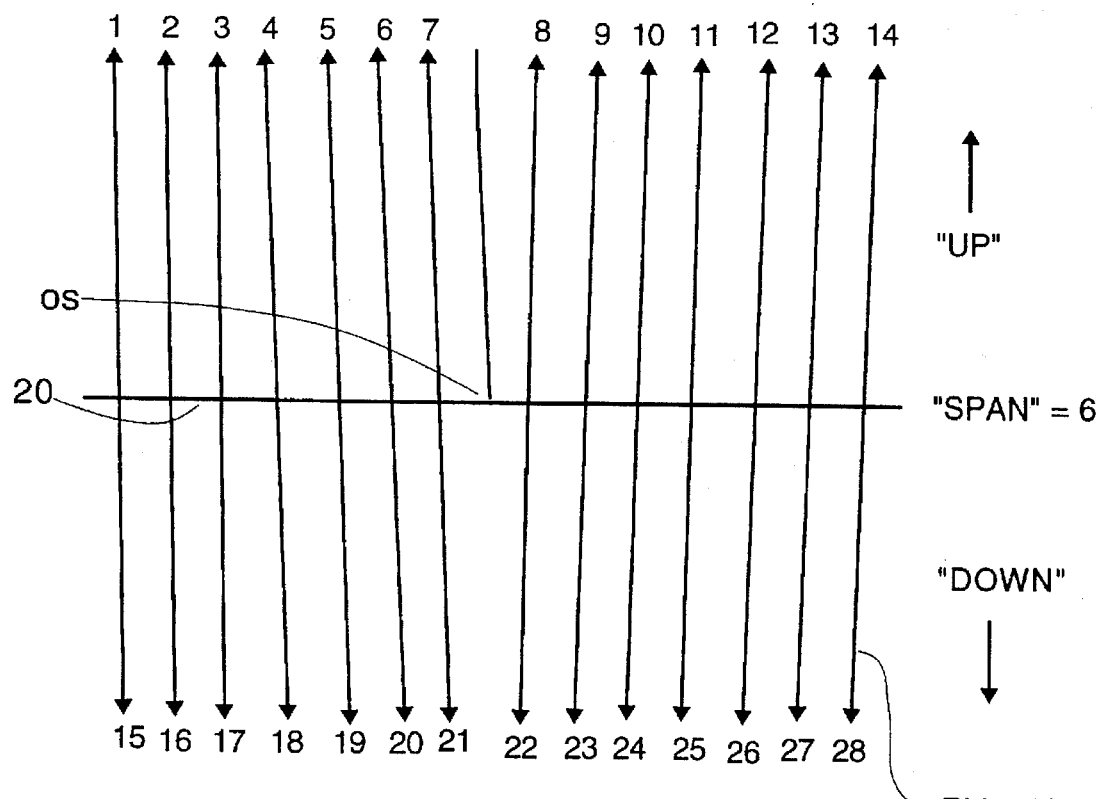
FIGS. 2A and 2B show the detail of how the generating line is oriented and, in a preferred embodiment, off-set in the two principle cases, namely, ridge endings and ridge bifurcations.
Figure 2B:
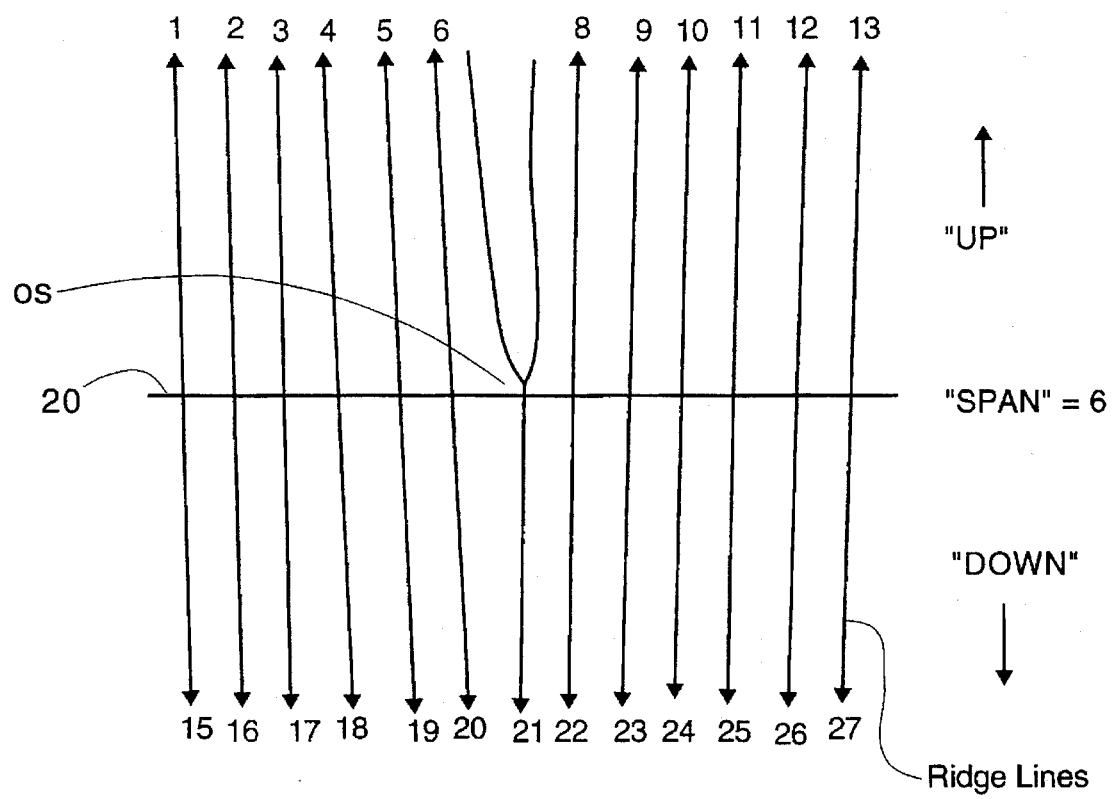

FIGS. 2A and 2B shows the detail of how the generating line 20 is positioned according to local ridge flow direction and preferably oriented and offset OS in the two cases—ridge ending (FIG. 2A) or bifurcation (FIG. 2B).

(5) A topological code vector is then generated in 16 through the process of ridge exploration.

Figure 3A:
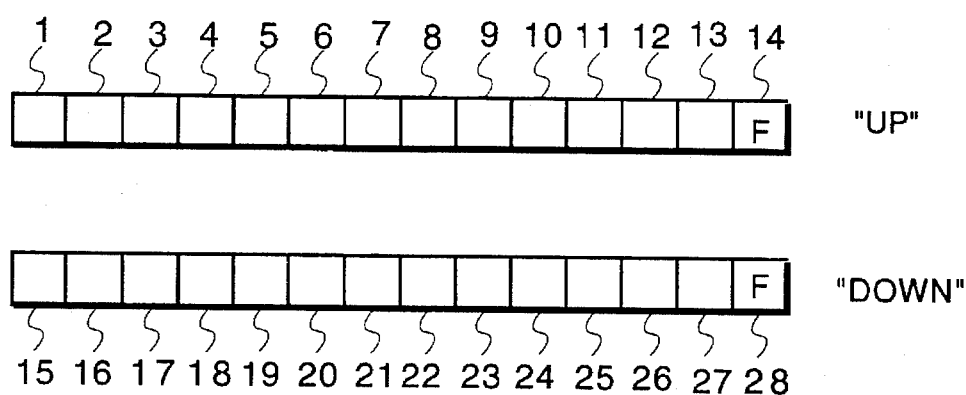
FIGS. 3A and 3B show how the vector entries correspond to the different ridge exploration events.
Figure 3B:
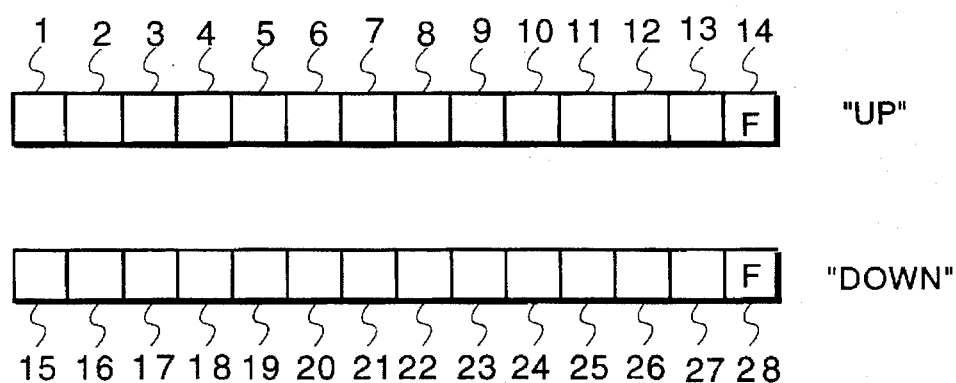

FIGS. 3A and 3B diagrammatically show how the vector entries correspond to the different ridge exploration events. The arbitrary terms "up" and "down" are merely terms of reference for the directions shown in FIGS. 3A and 3B.

The final position (14 in FIG. 3B) is "padded" both up and down in the case of a bifurcation.

FIG. 4 shows the selection of hexadecimal event codes according to different possible ridge-traced events. These are only slightly different from the original set disclosed in my above-reference patents and papers.

(6) For any ridge traced event that corresponds to another identified minutiae point (i.e. where the ridge-traced event is 2, 3, 4, 6, 7 or 8) the reference number of that other minutiae point is stored along with the topological exploration event code, as an "associated minutiae reference number". Otherwise a "0" or blank entry is made for the associated minutiae reference number.

Figures 5A, 5B:
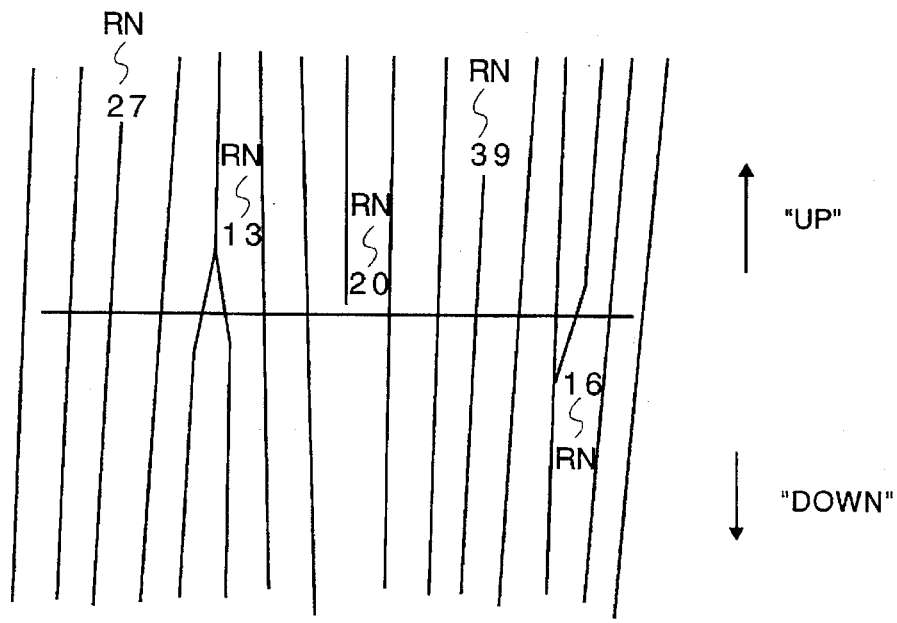
FIG. 5A shows a portion of a print around a minutiae point (minutiae reference No. 20) and spanning 6 ridge lines to each side of the minutiae point and, FIG. 5B illustrates the extracted vector centered on minutiae 20 of FIG. 5A.

FIG. 5 shows an extracted vector EV (centered on minutiae 20), complete with associated minutiae reference numbers RN, for a selected minutiae point (minutiae No. 20 in this case).

(7) For each minutiae on the print, the topological code vectors are recorded in a storage medium 17 (e.g. optical or magnetic), together with the following additional pieces of data:

(a) a reference or index number (an arbitrary ordering of the minutiae points), (b) spatial coordinates (according to some arbitrary global referencing scheme), (c) the minutiae type code ('e' for ridge ending, or 'b' for bifurcation), (d) an angular orientation of the minutiae point (per se known in the art).

(8) These sets of information are then combined for each minutiae visible on the print, producing a composite data record for the whole print which is stored in 17.

FIG. 6 shows a sample part of such a composite data record.

Figure 7:
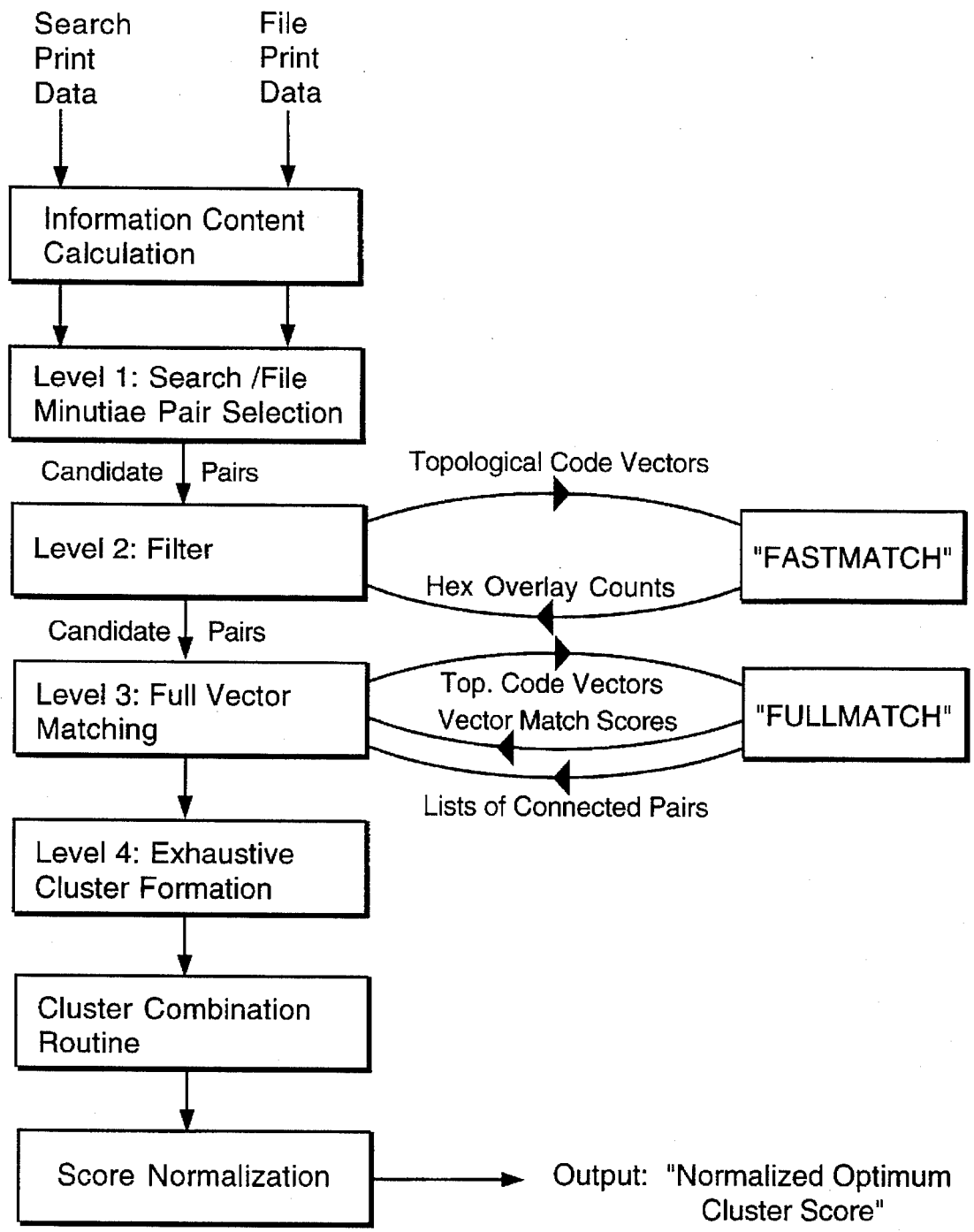
FIG. 7 shows a schematic of the stages of the matching algorithm.

FIG. 7 shows a schematic of the stages of the matching algorithm (Appendix A). They are in order:

(1) Read in search print data and file print data for comparison.

(2) Calculate "information content" for the search print and for the file print: This is essentially a count of the number of valid topological connections between minutiae which are represented within the topological code vectors. In practice it would be calculated once when a print was first introduced to the system, and the result stored as part of the data file. The "information content" measure is used only as part of the final score normalization procedure.

(3) Level 1: initial selection of search/file minutiae pairings: Level 1 provides a fast and efficient mechanism for generating search-file minutiae pairs. The large majority of these pairs will be false and are eliminated at subsequent stages of processing. All possible search/file minutiae pairings are evaluated against the following simple rules:

(a) do both the search and file minutiae vectors have sufficient non-trivial information content (i.e. the number of non-trivial topological connections represented exceeds a predetermined minimum threshold—"Filter 1"), (b) are the search and file minutiae angular orientations the same, within some predetermined tolerance parameter—"minimum angular tolerance".

Further rules could be added to speed processing in certain applications. For instance, global coordinates could be used to require that the search and file minutiae pairings came from essentially similar regions of the print. Another possible filtration rule would require that they be of the same type (i.e. both ridge-endings or both bifurcations).

Search/file minutiae pairings that pass the level 1 rules are passed to level 2.

(4) Level 2: "FASTMATCH" on topological code vectors: For each minutiae pair passing level 1, the topological code vectors for the search and file minutiae are compared. This comparison is designed to operate fast and within minimal computational load, so no use is made at this stage of the accompanying "associated minutiae reference numbers". The hexadecimal code vectors are essentially overlaid, and a count made of the number of times matching event codes appear in similar positions. This count can be referred to as the "hex overlay count".

Search/file minutiae pairs pass level 2 if and only if their "hex overlay count", as returned from subroutine "FULLMATCH" exceeds a predetermined threshold—"Filter 2".

The combinations passing the level 2 tests are stored in a table for subsequent processing. The file print index and search print index are stored, together with a "shift condition indicator" which records the precise alignment under which the vectors were best matched.

The shift condition indicator assumes the values 'O', 'f', or 's'. Condition 'O' shows that the score was obtained with the natural alignment of the search and file vectors. Condition 'f' shows a shift of one position (i.e. one ridge), where the file minutiae is type 'e' and the search minutiae is type 'b'. The search vector is effectively shifted one place to the right by adjusting all the FILE print references. Condition 's' is the converse, that is, the file minutiae is 'b' while the search minutiae is 'e'. "Shifted" scores can arise only if the central minutiae are of different types. If they are, and both the aligned and shifted matches given sufficiently high totals, then there is no objection to BOTH matches, that is, with and without a shift, forming entries in the Level 2 score table, and being passed on for further processing. If no minutiae pairs pass the Level 2 threshold score, processing is terminated and a zero score returned.

(5) Level 3: Full vector matching: Level 3 examines each of the search/file minutiae pairings (call them "base pairings") that passed level 2 in turn. For each pair the corresponding pair of topological code vectors are passed to subroutine "FULLMATCH". FULLMATCH incorporates a more detailed and sophisticated topological vector matching process, including:

(a) the use of crude distance tests, (b) score reduction for dependent pairings.

The FULLMATCH scoring procedure is very similar to that disclosed in my above-identified patents within the vector matching routines of MATCH 4 and LM6.

However, FULLMATCH performs one additional function here. For each vector match undertaken FULLMATCH returns a list of further search/file minutiae pairings, derived from the vector match through reference to the "associated minutiae reference numbers". These further pairings represent other minutiae on the search and file prints which are topologically connected to the base pairing in the same way, and through corresponding ridge explorations. These further search/file minutiae pairings are denoted "pairs connected to the base minutiae pair".

Figure 8:
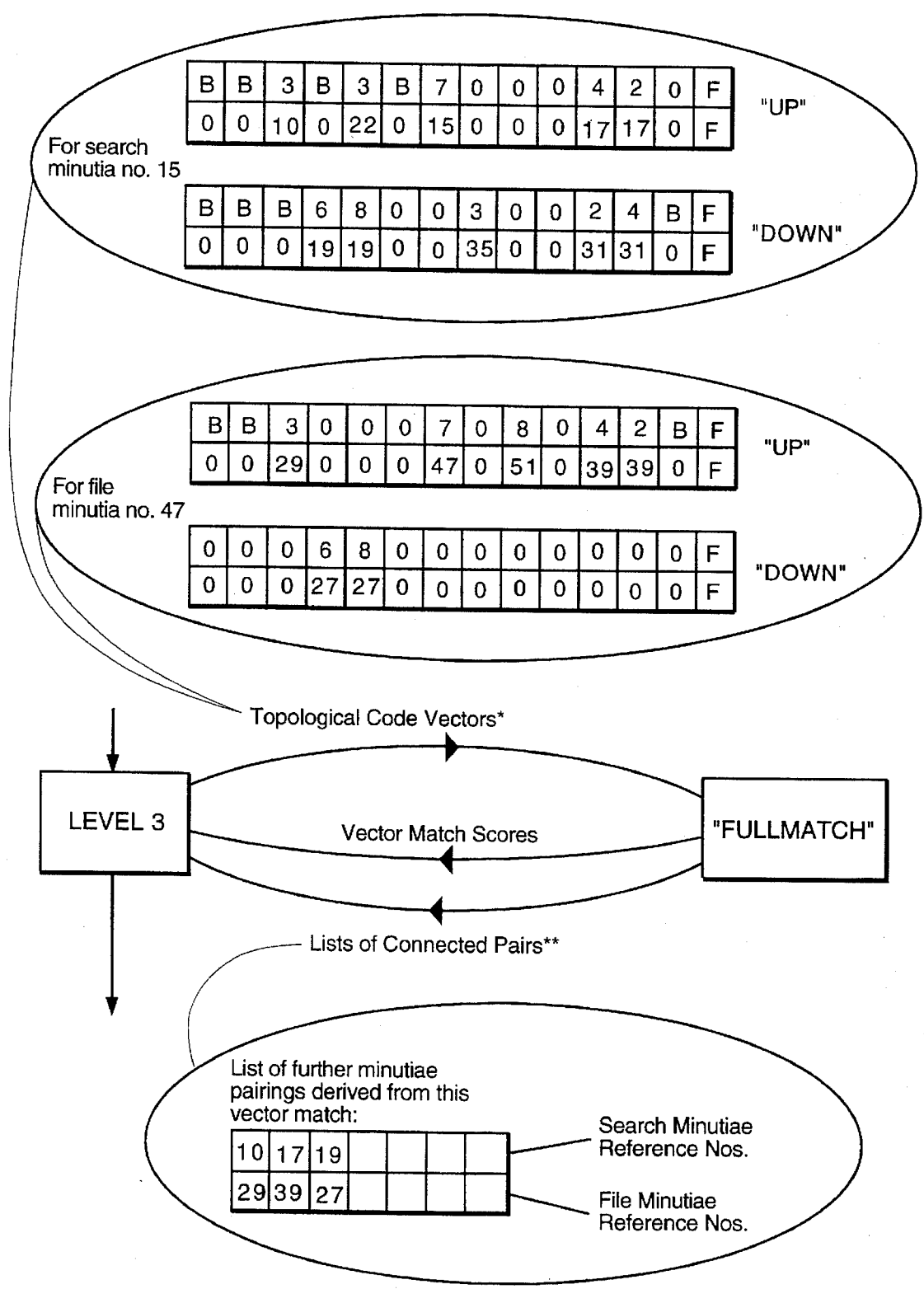
FIG. 8 illustrates returning of a pairs list from the full vector matching (level 3) of FIG. 7.

FIG. 8 illustrates the returning of a pairs list from FULL-MATCH.

After the use of FULLMATCH the vector comparisons that score above a threshold—Filter 3—are stored in a temporary table (Temporary Table 3), and the associated lists of connected pairs are retained for further use.

For each minutiae pair appearing in Temporary Table 3, a "1st order neighborhood" score is calculated by adding to its own vector match score the vector match scores for all the connected pairs returned from FULLMATCH. The "1st order neighborhood" score thus reflects not only how well the base vectors matched up, but also reflects how similar the vectors corresponding to all connected pairs were.

Then "2nd order neighborhood" scores are calculated for each base pair, simply adding together the "1st order neighborhood" scores for all the connected minutiae pairs.

The final version of Table 3 is constructed by reordering this information in descending order of the 2nd order neighborhood scores. A high composite neighborhood score provides a strong indication not only that the underlying vector match was a good one, but also that the minutiae in this pair are in fact topologically connected, in a manner consistent on both file and search prints, with a dense cluster of other high scoring minutiae pairs.

FIG. 9 shows the detailed matcher output of two prints under comparison, and the final version of Table 3 is printed out in full.

(6) Level 4: Exhaustive cluster formation: Minutiae pairs from Table 3 are lifted in sequence and used to generate exhaustively connected topological clusters. These clusters are recorded in sequence in "Table 4". The conceptual approach is to establish, in clusters, search/file minutiae pairings which are all connected together topologically.

The rules under which this general procedure is carried out are:

(a) A new entry from Table 3 is first checked against existing entries in Table 4 (from previously generated clusters) and forms the basis for generation of a new cluster if, and only if, it has not already appeared. The object of this rule is to prevent duplication of effort that would result from starting a new cluster from a pairing already included within some previous cluster.

(b) Once a cluster has been opened, no file index or search index is allowed to be repeated within the cluster. That avoids going over ground already covered within that cluster, and also avoids any file or search minutiae being matched against two different minutiae in the other print.

(c) In order for the clusters to be topologically exhaustive, pairings can be added whether or not they appeared in Table 3 (i.e. had a vector match score above the Level 3 threshold). However, only pairings that appeared in level 3 will be used to start the generation of a new cluster.

(d) Once a cluster is exhausted, its length is checked against a run time parameter—Filter 4—which specifies the minimum number of minutiae pairs to form a reportable cluster. If it is not large enough the cluster is deleted.

FIG. 10 shows a printout of Table 4, revealing a number of different clusters. The cluster score in each case is calculated as the sum of the second order neighborhood scores for each search/file minutiae pairing within the cluster.

(7) Cluster combination routine: A cluster combination routine is included to boost match scores in cases where two or more portions of the prints may match up quite well, but where these regions are topologically disconnected (e.g. by scars running across the fingers).

Cluster combination follows the following rules. First the best cluster from Table 4 is copied (into "Final" Table). Then each other cluster (if there are any) is examined in turn. These subsequent clusters are deemed to be either:

(a) Disjoint: None of their file indices or search indices appear in the current (possibly already extended) version of "final".

(b) Overlapping and non-contradictory: Some of the search/file minutiae pairings already appear in "final" (overlapping); but no file or search pairings appear with different pairings (i.e. non-contradictory).

(c) Contradictory: At least one of the search or file minutiae appears in "final" with a different mate.

Depending on which of these cases arises, "final" may be extended. The rules are:

(a) Disjoint cluster: add the whole cluster into "final" if the root minutiae pairing is distance compatible with all the existing entries in "final".

(b) Overlapping and non-contradictory: add in all minutiae pairings not already in "final".

(c) Contradictory: discard whole cluster.

FIG. 11 shows the final combined cluster produced during the print comparison following through from FIGS. 9 and 10.

(8) Final score calculation: The "second order neighborhood" scores are then summed for the best cluster, which may have been extended through the cluster combination stage. This composite score is then normalized to take account of the information content of both the search and file prints.

The effect and purpose of normalization, of course, is to correct high raw scores which resulted from information rich mismatches and which might have beaten down mate scores from very poor quality prints.

FIG. 12 shows a full table of matcher parameters, with reasonable (but not necessarily optimal) values. Optimal parameter tuning will depend heavily on the operational context and performance criteria.

The matching algorithm described herein is attached hereto as Appendix A, which is proprietary and protected by copyright.

While preferred embodiments of the invention have been illustrates and described, it will be appreciated that various other embodiments, adaptations and modifications of the invention will be readily apparent to those skilled in the art.

- Appendix A    #16

```
/************** COPYRIGHT: Malcolm K. Sparrow, 1994 ******************/
/************** COPYRIGHT: Malcolm K. Sparrow, 1994 ******************/
/************** COPYRIGHT: Malcolm K. Sparrow, 1994 ******************/

/***************** Last revised: 13th May 1994 ********************/

/*****************  4-stage matcher based upon concepts from LM6, but
    designed to accept minutia data (i.e. vectors) generated from local
    normals placed orthogonal to local ridge direction, rather than
    according to any global referencing system.  The matching
    logic generates a maximal topologically connected minutiae cluster
    within one print under examination for which there exists a
    corresponding topologically connected minutiae cluster within the
    other print under comparison, and within which the precise topological
    relationships between minutiae in the cluster are replicated.

Includes cluster combination logic, for scarred or fragmented prints.

***********************/

/*********** NOTE:  The version of the algorithm presented here does not
    include the code required to perform the reading in of the data,
    validation of that data, or administration of related files and
    directories.  The code that follows relates specifically to the
    matching process.  The surrounding administrative code will depend on
    the environment and format of the stored data files.   ***************/

/******************* Malcolm K. Sparrow **************************/ include <stdio.h>
include <stdlib.h>
#include <string.h>
#include <math.h>
#include <conio.h>
#include <alloc.h>
#include <sys\stat.h>
#include <ctype.h>
#include <dos.h>
include <dir.h> define LEN 80              /* Max. Length of parameter filename   */
define SPAN 6              /* Number of ridges crossed each side  */
#define VALENGTH (2*SPAN+2) /* Length of vector arrays needed      */
#define MAXCOUNT 60         /* Max. no. of minutiae per print      */
#define RESOLUTION 512      /* Angular resolution of data.         */
#define TABLE2LENGTH 1200   /* Max. no. of minutia pairs
                                expected to pass level 2           */
#define TABLE3LENGTH 300    /* Same, for levels 3 and 4.           */
#define TABLE4LENGTH 300

/*********** Variables available to all functions  ************/

/*********** Incoming file and search print data ******/

/************ The index number for each minutia may be stored in the files.
    Assumption here is that it is not read, but inferred by position.  So
    if it is present, it will simply be passed over. *******/ int fcount, scount;
```

```
            /* The number of minutiae in file/search print */ char ftype[MAXCOUNT], stype[MAXCOUNT];

/* the minutia type: 'e' or 'b' */ typedef struct{
         int y;
         int x;
       } point;

point fcoords[MAXCOUNT], scoords[MAXCOUNT];

/*** minutiae coordinates.  Order and global meaning is
            unimportant provided it is consistent  ***/ int fvector[MAXCOUNT][2][VALENGTH][2], svector[MAXCOUNT][2][VALENGTH][2];

/*** the extracted vector data.  Use of subscripts is as follows:

vector[i][j][k][l]

i: the minutia index number per the input order.
            j: = 0  means looking upwards from generating line
               = 1  means looking downwards from generating line
            k: = 0,1,2.... VALENGTH-1.  Identifies the ridge
                  intersection point, counting from left to right.
            l: = 0  shows the HEX code for ridge traced event
               = 1  shows the associated minutia index number

***************/ int forient[MAXCOUNT], sorient[MAXCOUNT];

/*** Orientation of each minutia.  Assumed here to be an integer
            in range 0-7  ***/ int fcontent[MAXCOUNT], scontent[MAXCOUNT];

/************ Measure of vector information content. (May
            eventually be incoming data if calculated and stored outside
            matcher.  In this version "content' is calculated for each
            search and each file vector as a preliminary operation to
            matching, within function 'main'.)   **********/

/************ Matcher parameters: to be read in from parameter file and
      made available to all functions *********/ int ems;       /* Exact Match Score                              */
int cms;       /* Close Match Score                              */
int dpair;     /*** Score reduction for dependent pair             ***/
int mdistol;   /*** Minimum Distance Tolerance                     ***/
int pdistol;   /*** Percentage Distance Tolerance                  ***/
int mangtol;   /*** Minimum Angular Tolerance                      ***/
int filter1;   /*** Minimum vector content for level 1 pairings    ***/
int filter2;   /*** Minimum overlay (masking) count for level 2    ***/
int filter3;   /*** Minimum vector match score for level 3         ***/
int filter4;   /*** Minimum cluster size for level 4               ***/
```

```
/********** Derived parameter for distance tests, from pdistol ****/ float fdistol;

/********** Miscellaneous other external variables ****************/ int score[16][16];
int numpairs, newpairs[VALENGTH*2][2];

/********** Function Declarations *********************************/ int setscore(void);
int fstmatch(int findex, int sindex, int fshift, int sshift);
int fulmatch(int findex, int sindex, int fshift, int sshift);
int distance(int findex1, int findex2, int sindex1, int sindex2);

/******************************  MAIN  ****************************/ void main(int argc, char *argv[] )
{
    FILE *outFile, *summary;
    int i, j, k, l, m, i1, total;
    int findex, sindex, fshift, sshift;
    int count1, count2, count3, count4;
    int srchtab[MAXCOUNT], stbcount;
    int table2[TABLE2LENGTH][4],
        temptab3[TABLE3LENGTH][8],
        table3[TABLE3LENGTH][8],
        table4[TABLE4LENGTH][4],
        final[MAXCOUNT][4];
    int memscore[MAXCOUNT][MAXCOUNT];
    int pairslist[TABLE3LENGTH*5][2], listpos;
    int ladder[TABLE3LENGTH];
    int clustnum, table3pos, pair, clustart[MAXCOUNT];
    long int sum, clustot[MAXCOUNT], hiclust, finaltot;
    int hiclustnum, hiclustsize, finalsize;
    int overlap, contradict, distcheck;
    int temp[VALENGTH*2][2], tempnum, alignsc, shiftsc;
    float finfo, sinfo, norm, hiclnorm, fintotnorm;
    char ch, swap, found;
/*
Clear the screen and read the necessary data.
*/
/*
First, get the matcher parameters from inFileName.
*/
    if( (rv = getParms(inFileName)) != 0){
        fprintf(stderr,"Unable to read parameters from %s. Aborting.\n", inFileNa
        exit(0);
    }
    fdistol = pdistol/100.0;

/*
Next, open the "outfile" and write the runtime parameters into it.  Do the
same for the screen summary file "summary".
*/
    if( (summary = fopen(summaryFileName, "w+t")) == NULL){
        fprintf(stderr, "Unable to create or open %s. Aborting\n",
                summaryFileName);
```

```
    exit(0);
}
if( (outFile = fopen(outFileName, "w+t")) == NULL){
    fprintf(stderr, "Unable to create or open %s. Aborting\n", outFileName);
    exit(0);
}
printf("\n*******************************************************************
printf(
     "\n\n                    SEARCH PRINT:    %s\n\n", fn1);
printf(
" FILE PRINT(S):        OPTIMAL CLUSTER:              TABLE 3 SCORE:\n");
printf(
"                    Size:    Score:    Norm:         Score:    Norm:\n")

fprintf(summary,
     "\n******************************************************************* fprintf(summary,"\n«PG»");
fprintf(summary,
     "\n\n                    SEARCH PRINT:    %s\n\n", fn1);
fprintf(summary,
" FILE PRINT(S):        OPTIMAL CLUSTER:              TABLE 3 SCORE:\n");
fprintf(summary,
"                    Size:    Score:    Norm:         Score:    Norm:\n")

/*************** Call Setscore to set up score matrix ****************/ setscore();

/************ Calculate scontent for incoming search print vectors. Create
     a table (srchtab) of those whose content exceeds "filter1". *********/ sinfo = 0;              /*** used to calculate aggregate information
                                content for the search print.  **********/
    stbcount = 0;
    for (sindex=1; sindex<=scount; sindex++)
    {
       total=0;
       for (j=0; j<=1; j++)
       {
          for (i=0; i<=VALENGTH-1; i++)
          {
             if (svector[sindex][j][i][1] != 0)
             {
                total++;
                if (i >=1 &&
                    svector[sindex][j][i][1] == svector[sindex][j][i-1][1])
                    total--;
             }
       } } } scontent[sindex] = total - 1 ;
       if (scontent[sindex] >= filter1) srchtab[++stbcount] = sindex;

sinfo += scontent[sindex];

} /* for(sindex... */ rewind(tf);
```

```
        for(l = 0; l < numDb; l++){
           strcpy(fn, searchPath);
           fgets(lineBuffer, 80, tf);
           i = strlen(lineBuffer);
           if(i == 1)
              break;   /* avoid processing null lines */
           lineBuffer[i-1] = '\0';
           strcat(fn, lineBuffer);
           if((rv = readTrc(fn, &fcount, ftype, fcoords, fvector, forient,
                    fcontent)) == -1){;
              fprintf(stderr, "Unable to read file record in %s.\n", fn);
              continue;
           }
ifdef MATCH /*
Insert "matcher code" between the ifdef and the endif.
*/

/*
Code to compare the prints begins here
*/
/****************  Calculate fcontent for the file prints.  This will
    ultimately be done prior to storage, and fcontent[ ]  stored.  The
    information content is 1 for each non zero minutia reference contained
    in the vector.  Repeats (i.e. dependent pairs) are only counted singly.
    Finally the count is reduced by one to eliminate the contribution made
    by reference to the central minutia.

For the sake of speed, this process could be made a little more crude
    by eliminating the check for dependent pairs.  For now it is left in.
    It may also be desirable to reorder the file or search minutiae
    vectors, or both, in descending order of information content
    (relabelling all minutiae index references accordingly).  Then the
    following 'for' loops could be curtailed for efficiency. *********/ finfo = 0;                  /* aggregate file print content ******/ for (findex=1; findex<=fcount; findex++)
        {
           total=0;
           for (j=0; j<=1; j++)
           {
              for (i=0; i<=VALENGTH-1; i++)
              {
                 if (fvector[findex][j][i][1] != 0 )
                 {
                    total++;
                    if (i >= 1 &&
                    fvector[findex][j][i][1]==fvector[findex][j][i-1][1] )
                       total--;
           } } }
           fcontent[findex] = total - 1 ;

finfo += fcontent[findex];

} /* for(findex = 1... */

/****************  MATCHER LEVEL 1  *************************************/
```

```
/********* Levels 1 and 2 are conducted in sequence, with the only report
    from level 1 being the number of minutiae pairings which satisfy the
    angular tolerance requirement for selection, and where both search and
    file prints have an information content exceeding filter1.  This count
    is called count1.  Other rules could, if desired, be added to level 1
    criteria.  Possible options include:

(1) requiring that the file and search minutia are the same
            type.   (i.e. ftype[findex] == stype[sindex] )

(2) some rough global positioning criterion (by coordinates)

*****************************/ count1 = count2 = count3 = count4 = 0;
sum = clustnum = hiclustsize = hiclust = 0;
finalsize = finaltot = 0;

for (findex = 1; findex <= fcount; findex++)
{
    if (fcontent[findex] >= filter1)
    {
        for (i = 1; i <= stbcount; i++)         /*** Run through only those
                                                 search minutia whose content
                                                 exceeds filter1.   *********/
        {
            sindex = srchtab[i];
            if (fabs( forient[findex] - sorient[sindex] ) <= mangtol   ||
                fabs( forient[findex] - sorient[sindex] ) >=
                        RESOLUTION-mangtol )
            {
                count1++;

/********** the minutia pair (findex, sindex) has passed the level 1
    selection criteria, so proceed to level 2 checks.  These lower level
    checks are supposed to be fast and crude, so level 2 does a preliminary
    vector comparison by hex code only, without any distance tests, and
    without any adjustment for dependent pairs.      **********************/

/******************** MATCHER LEVEL 2  ******************************/ total = fstmatch(findex,sindex,0,0);

if ( ftype[findex] == 'e' && stype[sindex] == 'e')
                    total--;

/***** this is a small adjustment to prevent
                    vectors centred around ridge endings having an
                    unfair advantage over those centred around
                    bifurcations.  The central ridge ending would
                    score twice (being seen on two neighboring ridge
                    explorations) whereas a central bifurcation or
                    close match at the centre will only score from
                    one ridge exploration.  **********************/ if (total >= filter2)
                {
                    count2++;
                    table2[count2][0] = findex;
```

```
            table2[count2][1] = sindex;
            table2[count2][2] = '0';
            table2[count2][3] = total;
        }

/***** combinations passing the level 2 tests are
        stored in table 2.  The file print index and
        search print index are stored, together with a
        "shift condition indicator", and the derived
        score from fastmatch.

The shift condition indicator takes the values
        '0','f', or 's'.  Condition '0' shows that the
        score was obtained with the natural alignment of
        the search and file vectors.

Condition 'f' shows a shift of one position
        (i.e. one ridge), where the file minutia is
        type 's' and the search minutia is type 'b'.
        The search vector is effectively shifted one
        place to the right by adding 1 to all the FILE
        print references, i.e. by setting fshift=1.

Condition 's' is the converse.  File minutia is
        'b'; search minutia is 'e'; the shift is obtained
        by setting sshift=1.        *********************/ if ( ftype[findex] != stype[sindex] )
        {
            fshift = (ftype[findex] == 'e') ? 1 : 0;
            sshift = 1 - fshift;
            total = fstmatch(findex,sindex,fshift,sshift);
            if (total >= filter2)
            {
                count2++;
                table2[count2][0] = findex;
                table2[count2][1] = sindex;
                table2[count2][2] = (fshift == 1) ? 'f' : 's' ;
                table2[count2][3] = total;

/********  the issue of a "shifted" score only
        arises if the central minutiae are of different
        types.  If they are, and both the aligned and
        shifted matches give sufficiently high totals,
        then there is no objection to BOTH matches (i.e.
        with and without a shift) forming entries in
        table 2.                    *****************/

}    /*    if (total >= filter2)              */
        }        /*    if (ftype[findex] != stype[sindex] )  */
    }            /*    if (forient[findex]-sorient[sindex]..  */
}                /*    for (i = 1; i <= stbcount; i++)        */
                 /*    if (fcontent[findex] >= filter1 etc.   */
                 /*    for (findex = 1; findex <= fcount; ..  */
/*********************** Check to see whether Level 3 is needed.  ******/
    if (count2 == 0) goto end;

/*************************** MATCHER LEVEL 3  *************************/
```

```
/************** For level 3 the (file index, search index, shift indicator)
     combinations are lifted from table 2, in sequence, and the relevant
     vector comparisons are repeated--this time by function fulmatch, which
     incorporates distance tests, orientation tests, and a reduction in
     score for dependent pairings. Resulting combinations that score above
     the threshold filter3 are stored in a temporary table "temptab3".
     "fulmatch" returns a list of further search and file minutia pairs from
     each vector comparison, which are stored in the table "pairslist". The
     [6]th and [7]th columns of temptab3 are used to record where, within
     "pairslist", the list of pairs for this vector match begins, and how
     many pairs it comprises.

This information is then used to compute aggregate stores for the
     1st and 2nd order neighborhoods, which are recorded in the [4]th and
     [5th] columns of temptab respectively. Finally table3 is constructed
     by reordering the information from temptab3 in descending order of the
     2nd order composite scores (i.e. column [5]). **********************/
listpos = 0;

for (findex=1; findex <= fcount; findex++)
    for (sindex=1; sindex <= scount; sindex++)
        memscore[findex][sindex] = 0;

for (k = 1; k <= count2; k++)
{
    findex = table2[k][0];
    sindex = table2[k][1];
    fshift = (table2[k][2] == 'f') ? 1 : 0 ;
    sshift = (table2[k][2] == 's') ? 1 : 0 ;

total = fulmatch(findex, sindex, fshift, sshift);

if (total > memscore[findex][sindex] )
        memscore[findex][sindex] = total;

/***** This creates in memscore a record of the highest
                   vector comparison scores derived from each file/search
                   minutia pairing. 'memscore' entries remain zero for
                   those pairings which did not make table2. **********/ if (total >= filter3)
    {
        count3++;
        temptab3[count3][0] = findex;
        temptab3[count3][1] = sindex;
        temptab3[count3][2] = table2[k][2];
        temptab3[count3][3] = total;
        temptab3[count3][6] = listpos + 1;
        temptab3[count3][7] = numpairs;

for (i = 1; i <= numpairs; i++)
        {
            pairslist[listpos+i][0] = newpairs[i][0];
            pairslist[listpos+i][1] = newpairs[i][1];
        }
        listpos += numpairs;
    }
} /* for(k = 1... */
```

```
/******************* Now run through the table3 entries again.
   For each associated minutia pairing which was returned from fulmatch,
   and which is therefore stored in "pairslist", pull the best vector
   score from memscore, and create a composite score for the "1st order"
   neighborhood. Composite scores are entered in the fifth  (i.e. [4])
   column of temptab3.
                                              ***********************/ for (k=1; k <= count3; k++)
   {
      temptab3[k][4] = temptab3[k][3];
      if (temptab3[k][7] > 0)
      {
         for (listpos = temptab3[k][6]; listpos <=
                 temptab3[k][6] + temptab3[k][7] - 1 ; listpos++)
         {
            temptab3[k][4] +=
              memscore[pairslist[listpos][0]][pairslist[listpos][1]];
   } } }

/************* Now create second order composite scores.  First the array
   "memscore" is reset to zero.  Then the 1st order composite scores
   are lifted from temptab3 column [4] and entered in the appropriate
   places within "memscore".  This is done in such a way that "memscore"
   then holds the best 1st order composite scores from each file/search
   minutia pairing that made it into temptab3.  Then the additive
   procedure used to generate the 1st order composite scores is repeated,
   this time generating the second order composite scores. *************/ for (findex = 0; findex <= fcount; findex++)
      for (sindex = 0; sindex <= scount; sindex++)
         memscore[findex][sindex] = 0;

for (k=1; k <= count3; k++)
      if (temptab3[k][4] > memscore[temptab3[k][0]][temptab3[k][1]] )
         memscore[temptab3[k][0]][temptab3[k][1]] = temptab3[k][4];

for (k=1; k <= count3; k++)
   {
      temptab3[k][5] = temptab3[k][4];
      if (temptab3[k][7] > 0)
      {
         for (listpos = temptab3[k][6]; listpos <=
                 temptab3[k][6] + temptab3[k][7] - 1 ; listpos++)
         {
            temptab3[k][5] +=
              memscore[pairslist[listpos][0]][pairslist[listpos][1]];
   } } }

/********************* Check to see whether Level 4 is needed. ****/ if (count3 == 0) goto end;

/*********************** Rearrange the entries of temptab3 by second
   order composite scores, in descending order, using a simple ladder
   sort.  The reordered table is held in "table3".  The copying of
   entries from temptab3 to table3 is done so as to exclude entries
   which repeat a "findex" or "sindex" value already used by a higher
   scoring pair (in order to show only compatible pairings in the
   final version of table3).  This is accomplished by placing markers
```

```
             in the [0]th row and [0]th column of memscore (otherwise not used)
             to show when a particular value of "findex" or "sindex" has already
             appeared.  For example, a previously used pairing of
             (findex=25, sindex = 12) is recorded by setting:
                 memscore [25][0] = 12 and
                 memscore [0][12] = 25.
             It is only whether these memscore entries are zero or non-zero
             that counts here.  The fact that the matching index numbers are
             recorded is not used here.                 **********************/ for (i = 1; i <= count3; i++) ladder[i] = i;
     do
     {
        swap = 'n';
        for (i = 1; i <= count3-1; i++)
        {
           if ( temptab3[ladder[i]][5] < temptab3[ladder[i+1]][5] )
           {
              j = ladder[i];
              ladder[i] = ladder [i+1];
              ladder[i+1] = j;
              swap = 'y';
     } } } /* if, for, do */
     while (swap == 'y');

/*** wipe memscore clean.  It is going to be used to
                         store the 2nd order neighborhood scores for those minutia
                         pairs that do appear in the reordered (final) version of
                         table3.                               *************/
     for (findex = 0; findex <= fcount; findex++)
        for (sindex = 0; sindex <= scount; sindex++)
           memscore[findex][sindex] = 0;

i = 0;
                    /*** i is used here as the number of entries made in the
                         final version of table3.           **************/
     for (k = 1; k <= count3; k++)
     {
        findex = temptab3[ladder[k]][0];
        sindex = temptab3[ladder[k]][1];
        if (memscore[findex][0] == 0 && memscore[0][sindex] == 0 )
        {
           memscore[findex][0] = sindex;
           memscore[0][sindex] = findex;
           memscore[findex][sindex] = temptab3[ladder[k]][5];

i++;
           for (j = 0; j <= 7; j++)
           {
              table3[i][j] = temptab3[ladder[k]][j];
           }
     } }
     count3 = i;
                                  /*** a reduced number of entries, due
                                       to elimination of duplicate appearances
                                       of file or search minutia indices. ***/
/*********************** MATCHER LEVEL 4  ****************************/
```

```
/*************** The entries are lifted from table3 in order, and copied
    into table4, each one forming the start of a new "cluster".  Whenever
    a new cluster is started the corresponding vector match is repeated
    through function "fulmatch", but this time with "extend" set to 'y'
    so that "fulmatch" returns a set of associated
    file/search minutiae pairs (via the external array "newpairs", with
    "numpairs" as the pairs count) as well as the vector match score. These
    new pairs (file index,search index) are entered into table4, extending
    the cluster.  They form the basis for extending the cluster further
    through further vector matching.  The cluster is extended to
    exhaustion, i.e. until the vector matches reveal no new file/search
    pairs other than those already contained in the cluster.

The conceptual approach is to establish, in clusters, search/file
    minutiae pairings which are all connected together topologically.

The precise rules under which this general procedure is carried out:

(1) A new entry being lifted from table3 is first checked against
        existing entries already in table4, and forms the basis for
        generation of a new cluster if, and only if, it has not
        already appeared.  The object is to prevent duplication of
        effort that would result from starting a new cluster from a
        pairing already included within a previous cluster.  One would
        expect the existing cluster to be reproduced, albeit reordered.

(2) Once a cluster has been opened, no file index or search index
        is allowed to be repeated within the cluster.  That avoids
        going over ground already covered within the cluster, and also
        avoids any file or search minutia being matched against two
        different minutia in the other print.

(3) Once in a cluster, all pairings returned from "fulmatch" will
        be added into table4 (subject to rule 2), whether or not the
        pairing appeared in table3 (i.e. scored above filter3 as a
        single vector match).

(4) Once a cluster is finished (i.e. exhausted), its length is
        checked against filter4 (the minimum number of minutiae pairs
        to form a reportable cluster).  If it is not large enough the
        cluster is deleted from table4.  (In fact count4 is simply reset
        to the start of that cluster, so that the entries are
        overwritten).

**************************************************************/ clustnum = 0;       /*** the number of the cluster currently being
                             worked upon.  ***/
    count4 = 0;         /*** number of valid entries already made in
                             table4 ***/
                        /*** table3pos is the number of the entry in
                             table3 used as starting point for the
                             current cluster **/ for (table3pos = 1; table3pos <= count3; table3pos++)
    {
                /*** first check rule (1) regarding new entry.  To be
                disallowed, the whole combination (file index, search
                index, shift condition) has to have appeared before. **/
```

```
found = 'n';
for (i = 1; i <= count4; i++)
{
   if (table4[i][0] == table3[table3pos][0]   &&
       table4[i][1] == table3[table3pos][1]   &&
       table4[i][2] == table3[table3pos][2]    )
   {
      found = 'y';
      break;
   }
} }  /* if, for */ if (found == 'n')
{
        /*** Start a new cluster *****/ pair = ++count4;        /*** pair marks position of the
                                file/search minutia pairing
                                to be sent to fulmatch ***/ for (j = 0; j <= 3; j++)
   {
      table4[count4][j] = table3[table3pos][j];
   }
                  /* copies the new entry into table4 */ clustart[++clustnum] = count4;

/*** notes the start position of the new
                       cluster within table4.   ************/ fshift = (table4[count4][2] == 'f') ? 1 : 0 ;
   sshift = (table4[count4][2] == 's') ? 1 : 0 ;

table4[count4][3] = fulmatch(table4[pair][0],
               table4[pair][1], fshift, sshift);

/*** this essentially recalculates what
                       was already known from table3, but also
                       generates the set of new pairings to
                       extend the cluster.  These new pairings
                       are returned from fulmatch through
                       the external array "newpairs".   ***/

/**** now copy the table "newpairs" into table4, checking not to
repeat any file index or search index numbers already appearing in
this cluster (i.e. rule 2).                   *******************/ for (k = 1; k <= numpairs; k++)
   {
      found = 'n';
      for (i = clustart[clustnum]; i <= count4; i++)
      {
         if ( table4[i][0] == newpairs[k][0]    ||
              table4[i][1] == newpairs[k][1]     )
         {
            found = 'y';
            break;
      } }  /* if, for(i... */
```

```
        if ( found == 'n')
        {
           count4++;
           table4[count4][0] = newpairs[k][0];
           table4[count4][1] = newpairs[k][1];
}  }   /* if, for(k... */
```

/**** Now look to see whether there are any outstanding new pairs
which have not yet been sent off to "fulmatch". While there are,
send them, and extend the cluster accordingly. Bear in mind that
newpairs will not have the determination as to "shift condition"
already made, so aligned and shifted matching will be tried where
appropriate, and the best score (and associated pairings) used. **/

```
     while ( pair < count4 )
     {
        pair++;         /*** there is another pair to send.  Prepare
                            to send them.   *********************/ alignsc = fulmatch(table4[pair][0], table4[pair][1],0,0);

/* sends them aligned, and stores score */ if ( ftype[table4[pair][0]] == stype[table4[pair][1]] )
        {
           table4[pair][2] = '0';
           table4[pair][3] = alignsc;
        }
            /*** if both central minutiae are of the same
                 type then there is no need to try shifted
                 vector matching.  But if not, proceed to try
                 the appropriate shifted match.    ************/
        else
        {
           for (k = 1; k <= numpairs; k++)
           {
              temp[k][0] = newpairs[k][0];
              temp[k][1] = newpairs[k][1];
           }
           tempnum = numpairs;

/*** puts newpairs aside in a temporary
                    register for now.  Then prepares the
                    appropriate shifted vector comparison.

"fshift" is set to 1 if the file minutia is
                    the ridge ending (and therefore the search
                    minutia is a bifurcation, because they are
                    of different types).     ******************/ fshift = (ftype[table4[pair][0]] == 'e') ? 1 : 0 ;
           sshift = 1 - fshift;

shiftsc = fulmatch( table4[pair][0], table4[pair][1],
                     fshift, sshift);

if (shiftsc > alignsc)      /*** shifted comparison better **/
           {
              table4[pair][2] = (fshift == 1) ? 'f' : 's' ;
              table4[pair][3] = shiftsc;
```

```
            }
            else
            {
               table4[pair][2] = '0';
               table4[pair][3] = alignsc;

/*** and copy the pairs from aligned comparison
                    back into newpairs.         ***************/ for (k = 1; k <= tempnum; k++)
               {
                  newpairs[k][0] = temp[k][0];
                  newpairs[k][1] = temp[k][1];
               }
               numpairs = tempnum;
            }

}       /*** this ends the "else", which covered the case of
                   different central minutia types ***************/

/***  now copy newpairs into table4, checking
                     rule 2 as you go.          ***************/ for (k = 1; k <= numpairs; k++)
      {
         found = 'n';
         for (i = clustart[clustnum]; i <= count4; i++)
         {
            if ( table4[i][0] == newpairs[k][0]      ||
                 table4[i][1] == newpairs[k][1]      )
            {
               found = 'y';
               break;
         } } if ( found == 'n')
         {
            count4++;
            table4[count4][0] = newpairs[k][0];
            table4[count4][1] = newpairs[k][1];
      }  }  /* if, for(i... */

}         /*** this ends the "while" statement, so control passes
                  this point only when the current cluster is exhausted.**/

/* now check on the size of the cluster **/ if (count4 - clustart[clustnum] + 1 < filter4 )   / too small /
   {
      count4 = clustart[clustnum] - 1;               /*** reset table4 ***/
      clustnum--;
   }

}            /*** this ends the "if" statement which determined that
                   a new cluster should be started.          ***/

}            /*** for (table3pos.........
                   this closes the "for" statement that cycles
                   through the entries in table3. ***********/
```

```
/* Calculate sum of the 2nd order composite scores, as a score.   ****/ sum = 0;
    for (i = 1; i <= count3; i++) sum += table3[i][5];

/* Check to see if any clusters have been found.   ******************/ if (clustnum == 0) goto end;

/* Identify best cluster, and record its size and total score. ******/ clustart[clustnum+1] = count4 + 1;     /*** for consistency, for
                                                treatment of last cluster. ***/
    hiclust = 0;
    hiclustsize = 0;

for (k = 1; k <= clustnum; k++)
    {
        clustot[k] = 0;            /* calculate cluster aggregate score.*/ for (i = clustart[k]; i < clustart[k+1]; i++)
        {
            findex = table4[i][0];
            sindex = table4[i][1];
            clustot[k] += memscore[findex][sindex];
        }
        if (clustot[k] > hiclust)
        {
            hiclust = clustot[k];
            hiclustnum = k;
            hiclustsize = clustart[k+1] - clustart[k];
        }
    }

/******************** Cluster Combination Stage. *************************/

/****** Cluster combination follows the following rules.  First the best
      cluster is copied (into "final").  Then each other cluster (if there
      are any) is examined in turn.  These subsequent clusters are deemed
      to be either:

(a) Disjoint: none of their file indices or search indices appear
                  in the current (possibly already extended) version of "final".
            (b) Overlapping and non-contradictory: some of the search/file
                  minutiae pairings already appear in "final" (overlapping);
                  but no file or search pairings appear with different pairings
                  (i.e. non-contradictory)
            (c) Contradictory: At least one of the search or file minutiae
                  appears in "final" with a different mate.

Depending on which of these cases arises, "final" may be extended.
      The rules are:

(a) Disjoint cluster: add the whole cluster into "final" if the
                  root minutiae pairing is distance compatible with all the
                  existing entries in "final".
            (b) Overlapping and non-contradictory: add in all minutiae pairings
                  not already in "final".
            (c) Contradictory: discard whole cluster.
```

```
                                    /*** Start with the best cluster ****/
finalsize = hiclustsize;
finaltot = hiclust;

if (clustnum == 1) goto end;        /*** Then can't do better than existing
                                         best cluster.        ****************/

/*** Copy best cluster into final ***/
for (i=1; i<= hiclustsize; i++)
   for (j=0; j <= 3; j++)
      final[i][j] = table4[ clustart[hiclustnum]+i-1 ] [j];

for (k=1; k <= clustnum; k++)       /*** For each cluster ***/
{
   if (k != hiclustnum)             /*** We already have the hicluster***/
   {
                                    /*** First establish whether the new
                                         cluster is disjoint, overlapping and
                                         non-contradictory, or contradictory */
         overlap = contradict = 0;
                                    /***  i will cycle through the entries
                                          in the cluster now being examined.
                                          j cycles through the entries already
                                          included in "final".   ************/ for (i = clustart[k]; i < clustart[k+1]; i++)
      {
         for (j = 1; j <= finalsize; j++)
         {
            if ( table4[i][0] == final[j][0]   &&
                 table4[i][1] == final[j][1] )  overlap = 1;

else if ( table4[i][0] == final[j][0]   ||
                      table4[i][1] == final[j][1] ) contradict = 1;
      } }

/*** Case (a): disjoint.   ****/
      if (contradict == 0 && overlap == 0)
      {
         distcheck = 1;
         j = 1;
         while (distcheck == 1 && j <= finalsize)
         {
            distcheck = distance(table4 [clustart[k]] [0], final[j][0] ,
                                 table4 [clustart[k]] [1], final[j][1] );
            j++;
         }
         if (distcheck)
         {
            for (i = clustart[k]; i < clustart[k+1]; i++)
            {
               finalsize++;
               for (j = 0; j <= 3; j++)
               {
                  final [finalsize] [j] = table4 [i] [j];
      } } } }
```

```
                                                   /*** Case (b): overlap.    ****/
          else if (contradict == 0 && overlap == 1)
          {
             for (i = clustart[k]; i < clustart[k+1]; i++)
             {
                found = 0;
                j = 1;
                while (found == 0 && j <= finalsize)
                {
                   if ( table4 [i][0] == final [j][0] ) found = 1;
                   j++;
                }
                if (found == 0)
                {
                   finalsize++;
                   for (j = 0; j <= 3; j++)
                   {
                      final [finalsize][j] = table4 [i][j] ;
    }  }  }  }
}                   /***   if (k != hiclustnum)        ***/
                    /***   for (k=1; k<= clustnum; k++) ***/

/*** Now calculate total cluster
                                             score for "final".  ****/
   finaltot = 0;
   for (i = 1; i <= finalsize; i++)
      finaltot += memscore [ final [i][0] ] [ final [i][1] ];
end:

/*********** Calculate normalized scores.  ***********************/ norm = sum * 100000.0 / ( finfo * sinfo) ;
   hiclnorm = hiclust * 100000.0 / (finfo * sinfo);
   fintotnorm = finaltot * 100000.0 / (finfo * sinfo);

/*********************** Results printout ***************************/
/*********************** Results printout ***************************/
/*********************** Results printout ***************************/

/*************** MAIN FILE ******** LEVEL 1 and 2 results *************/
   fprintf(outFile,
      "\n ***************************************************************");
   fprintf(outFile, "\n\n --> %s vs %s <--\n", fn1, fn);
   fprintf(outFile, "\n LEVEL 1: Search/file minutia pairs passing: %d",
                                    count1);
   fprintf(outFile, "\n LEVEL 2: Search/file minutia pairs passing: %d",
                                    count2);
   fprintf(outFile, "\n LEVEL 3: Non-duplicative pairs passing   : %d",
                                    count3);
   fprintf(outFile, "\n LEVEL 4: Number of clusters found        : %d",
                                    clustnum);
   fprintf(outFile,
      "\n\n OVERALL RAW SCORE (sum of 2nd order composites)    : %6ld ", sum);
   fprintf(outFile,
      "\n Info content (S,F) (%4.0f,%4.0f).    Normalized score: %7.1f \n",
         sinfo, finfo, norm);
```

```
/******************* Print out Table 2. ******************************/

/******************* This comment suppresses the printing out of table 2.
   Unsuppress only for debugging purposes as table 2 tends to be long.
    fprintf(outFile, "\n        TABLE 2:\n");
    fprintf(outFile, "\n        File index/ Search index/ Shift cond./ Score\n");

for (i = 1; i <= count2; i++)
    {
        fprintf(outFile, "\n        %8d %8d        '%c' %8d",
            table2[i][0], table2[i][1], table2[i][2], table2[i][3]);
    }
************************************/

/***************** Print out Table 3. ****************************/ if (count3 == 0) goto printsummary;

fprintf(outFile, "\n        TABLE 3:\n");
    fprintf(outFile,
        "\n        File / Search / Shift / Score / Comp1 / Comp2\n");
    for (i = 1; i <= count3; i++)
    {
        fprintf(outFile,"\n        %6d  %6d        '%c'  %6d  %6d  %6d",
            table3[i][0], table3[i][1], table3[i][2], table3[i][3],
            table3[i][4], table3[i][5]);
    }

/************* Print out each cluster. ****************************/ if (clustnum == 0) goto printsummary;

for (k = 1; k <= clustnum; k++)
    {
        fprintf(outFile,
            "\n\n        Cluster no: %2d        Size: %2d        Score: %ld \n",
            k, clustart[k+1] - clustart[k], clustot[k]);
        for (i = clustart[k]; i < clustart [k+1]; i++)
            fprintf(outFile, "\n        %6d  %6d        '%c'  %6d        %6d",
                table4[i][0], table4[i][1], table4[i][2], table4[i][3],
                memscore [table4[i][0]] [table4[i][1]] );
    }

/***************** Print out details of best cluster. *************/ fprintf(outFile,
"\n\n    Best cluster: No.%2d.   Size: %2d.   Score: %ld   (Norm: %.1f)\n",
        hiclustnum, clustart[hiclustnum+1] - clustart[hiclustnum], hiclust,
        hiclnorm);

/******* Print out details of final, combined, optimal cluster. *******/ if (clustnum == 1) goto printsummary;

fprintf(outFile,
"\n    Combined cluster:       Size: %2d.   Score: %ld   (Norm: %.1f) \n",
        finalsize, finaltot, fintotnorm);
```

```
    for (i = 1; i <= finalsize; i++)
        fprintf(outFile, "\n    %6d  %6d        '%c'  %6d          %6d",
            final[i][0], final[i][1], final[i][2], final[i][3],
            memscore [final[i][0]] [final[i][1]] );

/************************ Screen results, and summary file. ************/
printsummary:

printf(
        "\n %s          %2d    %6ld    %8.1f      %6ld   %8.1f ",
        fn, finalsize, finaltot, fintotnorm, sum, norm);
    fprintf(summary,
        "\n %s          %2d    %6ld    %8.1f      %6ld   %8.1f ",
        fn, finalsize, finaltot, fintotnorm, sum, norm);
/*
free memory, close or delete files and exit.
*/ endif              /* from #ifdef MATCH */
    }               /* the loop for multiple file prints */
  }                 /*** the loop for multiple search prints ***/
/***
    fprintf(outFile,
        "\n***********************************************************");
    fprintf(outFile,
        "\n***********************************************************");
***/
/*
close or delete files and exit.
*/
    fclose(summary);
    fclose(outFile);
    return;
}
/*********************************************************************/
/*********************** FUNCTION SETSCORE ***************************/
/*********************************************************************/
int setscore(void)
{
    register int i,j;

for (i=0; i<=15; i++)
        for (j=0; j<=15; j++)
            score[i][j]=0;

for (i=2; i<=8; i++)
        score[i][i]=ems;

for (i=2; i<=3; i++)
        score[i][i+1]=score[i+1][i]=cms;

for (i=6; i<=7; i++)
        score[i][i+1]=score[i+1][i]=cms;

return(0);
}
/*********************************************************************/
```

```
/*********************** FUNCTION FSTMATCH ****************************/
/*********************************************************************/
int fstmatch(int findex, int sindex, int fshift, int sshift)
{
    register int i,j;
    int total;

total = 0;
    for (j = 0; j <= 1; j++)
    {
        for (i = 0; i <= VALENGTH-1-fshift-sshift; i++)
        {
            /****** The truncation is to prevent spilling over
                    the end of the vectors when doing a "shifted" vector
                    vector comparison.        ***************************/ if (score[fvector[findex][j][i+fshift][0]]
                     [svector[sindex][j][i+sshift][0]] > 0) total++;
        } }
    return total;
}

/*********************************************************************/
/*********************** FUNCTION FULMATCH ****************************/
/*********************************************************************/
int fulmatch(int findex, int sindex, int fshift, int sshift)
{
    register int i,j;
    int total, mask, indexmem, fminutia, sminutia, angdiff;

total = 0;
    numpairs = 0;

for (j = 0; j <= 1; j++)
    {
        indexmem = 0;
        for (i = 0; i <= VALENGTH-1-fshift-sshift; i++)
        {
            mask = score[fvector[findex][j][i+fshift][0]]
                        [svector[sindex][j][i+sshift][0]];
            if (mask > 0)
            {
                fminutia = fvector[findex][j][i+fshift][1];
                sminutia = svector[sindex][j][i+sshift][1];

/*** fminutia and sminutia are used for economy
                     during the remainder of the "fulmatch" to save
                     having to keep on looking up which file and
                     search minutia index numbers are referenced
                     with the scoring hex codes.         *****/ if (fminutia != findex)
                {
                    /*********** apply the distance and orientation
                     tests, but there is no point doing all that if
                     the scoring reference is to the central
```

```
                minutia, in which case relevant distances are
                zero both within the file and search print.  ******/
        angdiff =  fabs( forient[fminutia] - sorient[sminutia] );

/*** angdiff is the difference in orientation
                between the file minutia referenced and the search
                minutia referenced.  It will be required to be within
                "mangtol".

The distance test is performed by function "distance"
                which returns value "1" if the test is passed and
                "0" otherwise.              **********************/ if (distance(findex,fminutia,sindex,sminutia)
            && ( angdiff <= mangtol  || angdiff >=
                RESOLUTION-mangtol ) )
        {
           total += mask;

if (fminutia == indexmem)
           total -= dpair;

/*******   this is the reduction for a dependent
                pair, flagged by the fact that the file (or
                search) minutia pointed to by the current ridge
                exploration event is the same as the one
                pointed to by the last ridge exploration event
                to score.       *****************************/ else              /* found a new pair  */
              indexmem = fminutia;

/********   update the "last scoring index"
                memory.         ***********************/ numpairs++;
           newpairs[numpairs][0] = fvector[findex][j][i+fshift][1];
           newpairs[numpairs][1] = svector[sindex][j][i+sshift][1];

/********   record the relevant file and search
                indices, but not if the scoring reference is to
                the central minutiae.

Note:  as presented here this allows for multiple
                entries to be made in newpairs for multiple
                references to the same minutia pairing, when
                accessed via different ridge explorations.
                Alternative logic could bracket the recording
                function within the preceding "else" so that
                dependent pairs would result in one entry only.
                That's been tried and appears to reduce mate
                scores more than mismate scores.      ***********/
        }       /*** if (distance and orientation tests.... ***/
  }             /*** if ( fminutia != findex )               ***/
  else
  {
                /*** just increment the score, and check for
```

```
                              dependency, but don't bother with the distance and
                              angular tolerance tests, as reference is to the
                              central minutia.         ********************/
                     total += mask;
                     if (fminutia == indexmem) total -= dpair;
                     else indexmem = fminutia;
               }
            }                 /*** last else                          ***/
         }                    /*** if ( mask > 0 )                    ***/
      }                       /*** for (i = 0......                   ***/
                              /*** for (j = 0......                   ***/
      return total;
}

/******************************************************************/
/************************** FUNCTION DISTANCE *********************/
/******************************************************************/
int distance(int findex1, int findex2, int sindex1, int sindex2)
{
   float fxdist, fydist, sxdist, sydist, fdist, sdist, diff;

/*********** For now the distance tests use the
                      euclidean metric.  May be replaced by something
                      quicker later, but we should tune the distance
                      parameters first with this (most natural) metric
                      before substituting less natural alternatives. *****/
   fxdist = fcoords[findex1].x - fcoords[findex2].x;
   fydist = fcoords[findex1].y - fcoords[findex2].y;
   sxdist = scoords[sindex1].x - scoords[sindex2].x;
   sydist = scoords[sindex1].y - scoords[sindex2].y;

fdist = sqrt ( pow(fxdist,2) + pow(fydist,2) );
   sdist = sqrt ( pow(sxdist,2) + pow(sydist,2) );

diff = fabs (fdist - sdist);

if (diff <= mdistol || diff <= (fdist+sdist)*fdistol / 2.0 )
      return (1);
   else
      return (0);
}
```

What is claimed is:

1. In a fingerprint recognition method in which images of fingerprints are electronically processed to provide an electronic image of ridge lines and minutiae points, said minutiae points including ridge endings and ridge bifurcations, with the positions of said minutiae points and a sequence of reference numbers being recordable in a storage medium, wherein each reference number (N) is arbitrarily assigned for each minutiae point, each of said ridge lines having a local ridge flow direction, respectively, the improvement comprising:

at each respective minutiae point projecting a generating line at a predetermined angle which is transverse to said local ridge flow direction, said generating line having a length sufficient to span a predetermined number of ridge lines to each side of each said minutiae point, respectively, for each generating line, from the point of crossing of said projected generating line with ridge lines within said span for said each minutiae point, exploring, in two directions, along any crossed ridge line from said generating line to the first occurring topological event in each of said two directions, respectively, and assigning a type code (T) to each said first occurring topological event, respectively, and generating one topological event code vector for each respective minutiae point, each topological event code vector being comprised of an ordered sequence of topological type codes (T) and reference numbers (N) for the minutiae points encountered during exploration of each ridge, for all the ridges intersected by said generating line.

2. The method defined in claim 1 including the step of storing said topological event code vectors in a machine searchable database.

3. The method defined in claim 1 wherein said generating lines are offset from the respective minutiae points, and are orthogonal to said local ridge flow direction, respectively.

4. In a fingerprint recognition method in which images of fingerprints are electronically processed to provide an electronic image of ridge lines and minutiae points, said minutiae points including ridge endings and ridge bifurcations, with the positions of said minutiae points and a sequence of reference numbers being recordable in a storage medium, wherein each reference number (N) is arbitrarily assigned for each minutiae point, each of said ridge lines having a local ridge flow direction, respectively, the improvement comprising:

at each respective minutiae point projecting a generating line at a predetermined angle which is transverse to said local ridge flow direction, said generating line having a length sufficient to span a predetermined number of ridge lines to each side of each said minutiae point, respectively, for each generating line, from the point of crossing of said projected generating line with ridge lines within said span for said each minutiae point, exploring, in two directions, along any crossed ridge line from said generating line to the first occurring topological event in each of said two directions, respectively, and assigning a type code (T) to each said first occurring topological event, respectively, and generating one topological event code vector for each respective minutiae point, each topological event code vector being comprised of an ordered sequence of topological type codes (T) and reference numbers (N) for the minutiae points encountered during exploration of each ridge, for all the ridges intersected by said generating line, storing said topological event code vectors in a machine searchable data base, producing, for each respective minutiae point in an unknown or latent fingerprint, a topological event code vector comprised of an ordered sequence topological type codes (T) and reference numbers (N), and identifying the maximal topologically connected cluster of minutiae points within one of the fingerprints in said machine searchable database for which there exists a matching cluster of minutiae points within the unknown or latent fingerprint and indicating when the topological relationships among the set of minutiae within said matching cluster are substantially identical.

5. The method defined in claim 4, including selecting an initial minutiae pairing, one from the file print and one from the unknown or latent fingerprint and making an initial comparison of the topological event code vector of the unknown or latent fingerprint with topological event code vectors stored in said machine searchable database to determine the number of times matching topological type codes (T) appear in similar positions in the topological event code vectors of the unknown or latent fingerprints stored in said machine searchable database, and determining if said number of times exceeds a predetermined threshold.

6. The method defined in claim 5, wherein during said initial comparison one of said topological event code vectors is shifted relative to the one with which it is being compared to determine the optimum alignment of the topological event code vectors stored in said machine searchable database with the topological event code vectors of said unknown or latent fingerprint.

7. The method defined in claim 6, wherein each set of topological event code vectors of fingerprints in said machine searchable database which have type code (T) in matching positions to the type codes in the topological code vectors for the unknown or latent fingerprints are further compared to locate other minutiae pairings which are connected to the initial minutiae pairing.

8. The method defined in claim 7, including further comparing of pairs of minutiae pairings to form clusters of minutiae pairings which are topologically connected together and in which no reference number (N) is repeated within the cluster.

9. The method defined in claim 8, including further comparing of numbers of minutiae pairings forming a cluster against a predetermined minimum number of minutiae pairs.

10. In a fingerprint recognition and retrieval system in which fingerprint images are electronically processed to provide a skeleton image of ridge lines and minutiae points constituted by ridge endings and bifurcations, with the spatial positions of said minutiae points and a sequence of reference numbers being recorded in a storage medium, wherein each reference number (N) is arbitrarily assigned for each minutiae point, each of said ridge lines having a local ridge flow direction, respectively, the improvement comprising:

means for projecting a vector generating line at a predetermined angle transverse to said local ridge flow direction at each minutiae point, respectively, said generating line having a length sufficient to span a predetermined number of ridges to each side of each said minutiae points, respectively, means for tracing along each ridge crossed by said vector generating line in first and second directions along each ridge line from the point of crossing of said vector generating line with each crossed ridge within the span for said each minutiae point along any crossed ridge line from said vector generating line to the first occurring topological event and assigning a type code (T) to said topological event, means for generating a topological event code vector for each minutiae comprised of an ordered sequence of topological event type codes (T) and reference number (N) for each minutiae encountered during the ridge tracing, for all the ridges intersected by said vector generating line, and means for storing said topological event code vectors in a machine searchable database.

11. The system defined in claim 10 wherein said generating lines are offset from said minutiae points and orthogonal to said local ridge flow direction.

12. The system defined in claim 10 wherein one of said fingerprints is an unknown fingerprint and the topological event code vectors for said unknown fingerprint are generated for matching with topological event code vectors of fingerprints stored in said machine searchable database, further including:

comparison means having means for identifying the maximal topologically connected cluster of minutiae points within one fingerprint for which there exists a matching cluster of minutiae points within the fingerprint under comparison and wherein the topological relationships among the set of minutiae within said matching cluster are substantially identical.

13. In a fingerprint recognition and retrieval method in which fingerprint images are processed to provide an image of ridge lines and minutiae points constituted by ridge endings and bifurcations, with a reference number (N) for each minutiae point being recorded in a storage medium, each of said ridge lines having a local ridge flow direction in the vicinity of each minutiae, respectively, the improvement comprising:

projecting a vector generating line at an orthogonal angle to said local ridge flow direction at each minutiae point, respectively, said vector generating line being offset from said minutiae point and having a length sufficient to span a predetermined number of ridges to each side of each said minutiae point, respectively, for each said vector generating line, tracing along any crossed ridge line from said projected generating line to the first occurring topological event and assigning a type code (T) to said topological event, generating a topological event code vector for each vector generating line, each topological event code vector being comprised of a sequence of topological type event codes (T) for the minutiae encountered during the ridge tracing and the reference number (N) for that minutiae, for all the ridges intersected by said vector generating line, storing each said topological event code vector for each fingerprint in a machine searchable database, and identifying the maximal topologically connected cluster of minutiae points within an unknown one of said fingerprints for which there exists a matching cluster of minutiae points within the fingerprint under comparison and wherein the topological relationships among the set of minutiae within said matching clusters are substantially identical.

14. The method defined in claim 13, including selecting an initial minutiae pairing, one from the file print and one from the unknown or latent fingerprint and making an initial comparison of the topological event code vector of the unknown or latent fingerprint with topological event code vectors stored in said machine searchable database to determine the number of times matching topological type codes (T) appear in similar positions in the topological event code vectors, of the unknown or latent fingerprints stored in said machine searchable database, and determining if said number of times exceeds a predetermined threshold.

15. The method defined in claim 14, wherein during said initial comparison one of said topological event code vectors is shifted relative to the one with which it is being compared to determine the optimum alignment of the topological event code vectors stored in said machine searchable database with the topological event code vectors of said unknown or latent fingerprint.

16. The method defined in claim 10, wherein each set of topological event code vectors of fingerprints in said machine searchable database which have type code (T) in matching positions to the type codes in the topological code vectors for the unknown or latent fingerprints are further compared to locate other minutiae pairings which are connected to the initial minutiae pairing.

17. The method defined in claim 16, including further comparing of pairs of minutiae pairings to form clusters of minutiae pairings which are topologically connected together and in which no reference number (N) is repeated within the cluster.

18. The method defined in claim 17, including further comparing of numbers of minutiae pairings forming a cluster against a predetermined minimum number of minutiae pairs.

19. In a fingerprint recognition and retrieval method in which the spatial positions of fingerprint minutiae points and a reference number for each minutiae point are recorded in a storage medium, the improvement comprising:

determining the local ridge flow direction in the vicinity of each minutiae point defined by ridge endings and ridge bifurcations, projecting a vector generating line at an angle orthogonal to said local ridge flow direction and offset at each minutiae point, said vector generating line having a length sufficient to span a predetermined number of ridges to each side of each said minutiae point, respectively, tracing in two directions along any crossed ridge line from each vector generating line, respectively, to the first occurring topological event along the ridge line being traced and assigning a type code (T) to said topological event, generating a topological event code vector for each minutiae comprised of an ordered sequence of the reference number (N) and topological type event codes (T) for each topologically occurring event encountered during the ridge tracing, for all of the ridges intersected by said vector generating line, storing each said topological event code vector in a machine searchable database, and identifying the maximal topologically connected cluster of minutiae points within an unknown one of said fingerprints for which there exists a matching cluster of minutiae points within the fingerprint under comparison and wherein the topological event code vectors among the set of minutiae within said matching cluster are substantially identical.

20. In a fingerprint recognition and retrieval system in which the positions of fingerprint minutiae points and a sequence of reference numbers are recorded in a storage medium, wherein each reference number (N) is arbitrarily assigned for each minutiae point, said fingerprint minutiae points including ridge endings and ridge bifurcations, the improvement comprising:

means for determining the local ridge flow direction in the vicinity of each minutiae point defined by ridge endings and ridge bifurcations, means for projecting a vector generating line at an orthogonal angle to said local ridge flow direction and offset at each ridge ending and ridge bifurcation, respectively, each said generating line having a length sufficient to span a predetermined number of ridges to each side of each said minutiae point, respectively, means for tracing in first and second directions along each ridge from the point of crossing of said projected vector generating line with ridges in two directions along each side of any crossed ridge line to the first occurring topological event in each of said first and second directions and assigning a type code (T) to said topological event, respectively, means for generating a topological event code vector for each minutiae comprised of the reference number (N) for said each minutiae, the directions of said tracing, the number of each ridge traced within the span for said minutiae, and the topological type code (T) for the minutiae encountered during said tracing, means for storing each said topological event code vector for each fingerprint in a machine searchable database, and means for identifying the maximal topologically connected cluster of minutiae points within an unknown fingerprint with one of said fingerprints for which there exists a matching cluster of minutiae points within the fingerprint under comparison and wherein the topological event code vectors among the set of minutiae within said matching cluster are substantially identical.

* * * * *